United States Patent
Li et al.

(10) Patent No.: US 12,490,161 B2
(45) Date of Patent: Dec. 2, 2025

(54) RE-MAPPING NETWORK SLICES FOR SUPPORTING SERVICE CONTINUITY

(71) Applicant: ZTE Corporation, Guangdong (CN)

(72) Inventors: Dapeng Li, Guangdong (CN); Yin Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 646 days.

(21) Appl. No.: 17/850,139

(22) Filed: Jun. 27, 2022

(65) Prior Publication Data

US 2022/0330117 A1    Oct. 13, 2022

Related U.S. Application Data

(63) Continuation of application No. PCT/CN2020/107747, filed on Aug. 7, 2020.

(51) Int. Cl.
*H04W 36/06* (2009.01)
*H04W 36/00* (2009.01)
*H04W 48/18* (2009.01)

(52) U.S. Cl.
CPC ........... *H04W 36/06* (2013.01); *H04W 48/18* (2013.01); *H04W 36/0058* (2018.08)

(58) Field of Classification Search
CPC . H04W 36/06; H04W 48/18; H04W 36/0058; H04W 28/16; H04W 92/20; H04L 67/14
See application file for complete search history.

(56) References Cited

U.S. PATENT DOCUMENTS

2018/0352050 A1* 12/2018 Li ................. H04L 67/5682

FOREIGN PATENT DOCUMENTS

| AU | 2016102415 A4 | 6/2019 | |
|---|---|---|---|
| CN | 110838927 A | 2/2020 | |
| EP | 3592035 A1 * | 1/2020 | ............ H04W 48/06 |
| WO | WO-2018215076 A1 * | 11/2018 | ........ H04W 36/0016 |
| WO | 2021109416 A1 | 6/2021 | |

OTHER PUBLICATIONS

Written Opinion for Singapore Patent Application No. 11202250642N, mailed Feb. 20, 2025 (9 pages).
Notification to Complete Formalities of Registration for Chinese Patent Application No. 202080098925.8, mailed Mar. 7, 2025 (10 pages).
(Continued)

*Primary Examiner* — Charles C Jiang
*Assistant Examiner* — Rachel Elizabeth Marks
(74) *Attorney, Agent, or Firm* — Perkins Coie LLP

(57) ABSTRACT

Methods, systems, and devices related to digital wireless communication, and more specifically, to techniques related to sending, by a first network node to a second network node, a first message including information for handling access and mobility management tasks associated with a mobile device, wherein the first network node is serving a mobile device in a coverage area of the first network node; and determining, at the first network node, based on a response message from a second network node, information of one or more resources available to the mobile device from the second network node in a case that the one or more resources are re-mappable from the first network node.

20 Claims, 19 Drawing Sheets

1500

```
sending, by a first network node to a second network node, a
first message including information for handling access and
mobility management tasks associated with a mobile device,
wherein the first network node is serving a mobile device in
a coverage area of the first network node
```
⎯ 1502

```
determining, at the first network node, based on a response
message from a second network node, information of one or
more resources available to the mobile device from the
second network node in a case that the one or more resources
are re-mappable from the first network node
```
⎯ 1504

(56) References Cited

OTHER PUBLICATIONS

Huawei et al., "OI#2 TS 23.501: Updates Network Slicing and NSSF description," SA WG2 Meeting #123, S2-178134, Oct. 23-27, 2017, Ljubljana, Slovenia (7 pages).
Communication under Rule 71(3) EPC for European Patent Application No. 20948124.1, mailed Mar. 14, 2025 (57 pages).
ZTE et al., "Initial consideration on study of enhancement of RAN Slicing," 3GPP TSG-RAN WG3 #109-e, E-Meeting, R3-205184, 7 pages, Aug. 17-28, 2020.
ZTE, "TP for TR 38.832," 3GPP TSG-RAN WG3 #109-e, E-Meeting, R3-205185, 4 pages, Aug. 17-28, 2020.
Extended European Search Report for European Patent Application No. 20948124.1, mailed Nov. 7, 2022 (14 pages).
Office Action for Chinese Patent Application No. 202080098925.8, mailed Jul. 15, 2024 (26 pages).
China Telecom, "Discussion on slice re-mapping and fallback upon handover," 3GPP TSG-RAN WG3 Meeting #109-e, Online, R3-204902, 3 pages, Aug. 17-28, 2020.
Ericsson, "Description of Slice Remapping," 3GPP TSG-RAN WG3 #109-e, E-Meeting, R3-205061, 4 pages, Aug. 17-28, 2020.
Ericsson, "Description on slice Re-mapping at mobility," 3GPP TSG-RAN WG3 #109-e, E-Meeting, R3-205030, 6 pages, Aug. 17-28, 2020.
International Search Report and Written Opinion for International Application No. PCT/CN2020/107747, mailed on May 6, 2021 (7 pages).

\* cited by examiner

RE-MAPPING NETWORK SLICES FOR SUPPORTING SERVICE CONTINUITY

CROSS REFERENCE TO RELATED APPLICATIONS

This patent document is a continuation of and claims benefit of priority to International Patent Application No. PCT/CN2020/107747, filed on Aug. 7, 2020. The entire content of the before-mentioned patent application is incorporated by reference as part of the disclosure of this application.

TECHNICAL FIELD

This patent document is directed generally to wireless communications.

BACKGROUND

The rapid development of mobile communication has penetrated into all aspects of people's work, social life, and life, and has brought a huge impact on people's lifestyle, work style, social politics, economy and other aspects. Human society has entered the information age, and business application requirements in all aspects are showing explosive growth. In the future, mobile networks will not only provide communication between people, but also provide services for mass devices of the Internet of Things. For example, virtual reality, high-definition video, and other services that require ultra-high-speed services, the rate can reach 10 to 100 times the current rate; such as the Internet of Vehicles and other services that require low-latency services, the end-to-end delay can be reduced by 5 times; Networking can access 1,000 times the current number of services, and the battery life can also be extended to 10 times the current.

The differentiated business model and service requirements have brought huge challenges to the future wireless mobile broadband system in terms of frequency, technology and operation. The traditional communication network, namely the Residential Access Network (RAN)+core CORE is increasingly unable to meet all scenarios. Building a dedicated network for every scenario will cause a lot of waste of resources, which is not practical.

The development of Network Function Virtualization (NFV) technology makes it possible for operators to build different virtual networks for different business requirements. Network slicing is based on a general physical infrastructure to logically define and divide the network to form an end-to-end virtual network. Each virtual network has different functions and characteristics to dynamically meet various needs and business models.

A typical network slice includes a set of virtualized access network functions and core network functions. Network slicing is constructed by the operator according to requirements and strategies, and the functions included in a network slice are also determined by the operator according to requirements and strategies. For example, some network slices may include a dedicated forwarding plane in addition to the control plane function, while some network slices may only include some basic control plane functions.

SUMMARY

This document discloses methods, systems, and devices related to digital wireless communication, and more specifically, to techniques related to reselecting a network in a network sharing split architecture.

In one exemplary aspect, a method for wireless communication includes sending, by a first network node to a second network node, a first message including information for handling access and mobility management tasks associated with a mobile device, wherein the first network node is serving a mobile device in a coverage area of the first network node; and determining, at the first network node, based on a response message from a second network node, information of one or more resources available to the mobile device from the second network node in a case that the one or more resources are re-mappable from the first network node.

In another exemplary aspect, a method for wireless communication includes receiving, at a second network node, a configuration exchange message including information of slice resources supported by a coverage area of a first network node for a mobile device served by the first network node, wherein the information of slice resources are used for a handover for the mobile device based on the configuration exchange message in a case that the one or more resources are re-mappable from the first network node to the second network node.

In another exemplary aspect, a method for wireless communication includes sending, by a first network node to a second network node, a handover request for handing off a mobile device, wherein the handover request results in re-mapping of resources to the second network node from the first network node initially serving the mobile device in a coverage area of the first network node.

In another exemplary aspect, a method for wireless communication includes determining, at a second network node, a re-mapping of resources from a first network node to the second network node in a case that a mobile device in a coverage area supported by the first network node ceases to be supported by the first network node; and sending, to the first network node, an acknowledgement to a handover request associated with handing off the mobile device from the first network node to the second network node.

In another exemplary aspect, a method for wireless communication includes receiving, at a second network node, a handover request associated with handing off service to a mobile device in a coverage area supported by a first network node, wherein the handover request includes information for selecting allowed network resources for providing the service to the mobile device; and selecting, at the target network node, one or more network resources, based on the information for selecting the allowed network resources.

In another exemplary aspect, a wireless communications apparatus comprising a processor is disclosed. The processor is configured to implement a method described herein.

In yet another exemplary aspect, the various techniques described herein may be embodied as processor-executable code stored on a computer-readable program medium.

The details of one or more implementations are set forth in the accompanying attachments, the drawings, and the description below. Other features will be apparent from the description and drawings, and from the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

In current designs of network deployments, availability of some network slices may be limited only to a part of the network. This implies that continuity of service may not guaranteed in some deployment scenarios.

Figure 1:
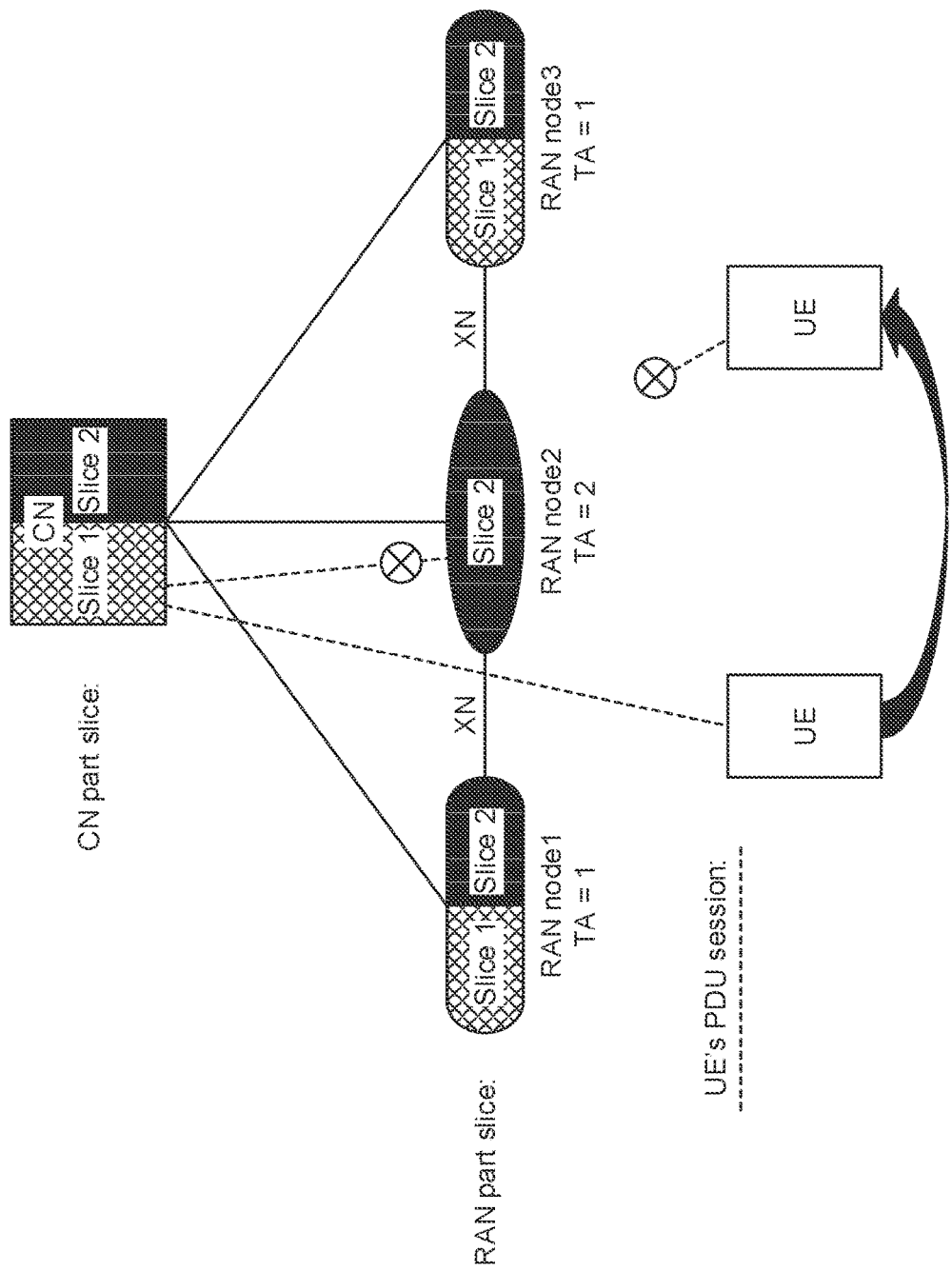
FIG. 1 is a schematic diagram of a 5G architecture showing issues associated with continuity of service.

FIG. 1 is a schematic diagram of a 5G architecture showing issues associated with continuity of service. For example, as shown in FIG. 1, different network slices may be deployed in different RAN nodes (alternatively termed herein as base stations). Based on the SLA (Service level agreement), a Mobile Network Operator (MNO) provides different network slices to RAN node 1 and RAN node 3. (As used herein, a network slice is defined as an end-to-end logical communication network, within a Public Land Mobile Network (PLMN) and includes the Core Network (CN) Control Plane, User Plane Network Functions and 5G Access Network (AN).) For example, RAN node 1 has access to network slice 1 and network slice 2, and connects to Core Network (CN). However, RAN node 3 has access only to network slice 2. Network slice 1 is not supported or provided to RAN node 2. This is shown using a circled cross symbol in FIG. 1. Further, as shown in FIG. 1, network slice 1 and network slice 2 are isolated from one another. This indicates that resources in a slice are directed only to UEs served by the slice. For example, a UE's protocol data unit (PDU) session (shown using dotted lines) utilizes resources provided by network slice 1 and the UE's PDU session is not allowed to use resources of network slice 2. A UE accesses the radio network via RAN node 1 as its access point. The UE requests a PDU session to provide data transmission service. The PDU session request message is sent from UE to core network (CN) node. As shown in FIG. 1, CN selects network Slice 1 to provide network side resource for the UE's PDU session.

In addition, as shown in FIG. 1, a UE can be mobile and move from a cell in RAN node 1 to a cell in RAN node 2. In that scenario, because RAN node 2 does not support slice 1, service continuity is not guaranteed, and hence the UE's PDU session will be terminated based on conventional technological designs. This is shown using a circled cross symbol in FIG. 1.

In another hypothetical scenario, a UE's PDU session is setup using Slice 2 via RAN node 2. When the UE moves to a cell in RAN node 3, it is possible that resources in Slice 2 in RAN node 2 may be in shortage. In this case, because Slice 2 is short in resources to support the UE's PDU session, the UE's PDU session is terminated. Continuity of service by RAN node 2 is not guaranteed.

Accordingly, the afore-mentioned issues of service discontinuity need to be mitigated. In some embodiments, the schematic in FIG. 1 may represent a 5G structure as specified by the 3GPP TS 38.300 protocol. The structure may include a 5G core network (5GC or 5G core) and a 5G access network. The 5G core network may include network elements relating to an access and mobility management unit (AMF), a user plane function (UPF), and a 5G access network that may include a network element 5G enhanced eNB base station (ng-eNB) or a 5G base station (gNB). The interface between the network element of the core network and the network element of the access network may include an NG interface, and the interface between the network elements of the access network may include an Xn interface. A RAN node can be a gNB (5G base station) providing New Radio (NR) user plane and control plane services. As another example, a RAN node can be an enhanced 4G eNodeB that connects to the 5G Core network via the NG interfaces but still uses 4G LTE air interface(s) to communicate with the 5G UE.

Example Embodiments

Embodiments of the present technology are directed at providing continuity of service to a user equipment (UE) by slice re-mapping. A slice in a 5G network is associated with a slice-ID. While conventional RAN slicing is limited only to a one-time mapping of slice-ID to configuration rules for the RAN, slice re-mapping allows repeated utilization of resources by re-utilizing slice-IDs multiple times, e.g., each mapping allows the slice-IDs to be used for different rules for the RAN.

The embodiments herein apply to mobility environments where a UE leaves a coverage area of a mobile operator, and yet receives continued or uninterrupted service in the new area. The embodiments can also be applicable in scenarios where a base station and/or the core network have sufficient resources to deploy, but the resources cannot be used because the resources are either in shortage or the resources belong to different slice(s).

To provide continued or uninterrupted service, the source base station and/or target base station first identifies the mobility scenario. Embodiments of the present technology are directed at identifying mobility scenarios (e.g., discussed in example embodiments 1 through 4) based on one or more of the following information attributes:

a. information indicating whether the source base station and the target base station belong to the same Access and Mobility Management Function (AMF) or AMF set. The AMF or AMF set can include capability information for handling connection and mobility management tasks associated with a UE electronically coupled to the source base station and/or the target base station (embodiment 1).

b. information identifying a list of slices that are supported by the target base station's coverage area (embodiment 2)

c. information indicating whether the target base station supports the RAN slice remapping functionality (embodiment 3)

d. information indicating whether the core network supports the RAN slice remapping functionality (embodiment 4)

After the base station identifies the mobility scenario, the further problem that needs to be solved is for the source base station to determine a method to support slice re-mapping. For example, the method to support a slice re-mapping by the source base station is different from a method to support slice re-mapping by the core network. Embodiments of the present technology are directed at several methods (e.g., discussed in example embodiments 5 through 8) to support slice re-mapping:

Method 1: Slice Re-Mapping By The Core Network (Embodiment 5)

The source base station sends a slice re-mapping request to the core network, and the core network performs slice re-mapping for the service of the UE and notifies the source base station of the result. The source base station switches the UE to the target base station.

Method 2: Slice Re-Mapping By Both The Target Base Station and The Core Network (Embodiment 6)

The source base station sends a Handover Request message to the target base station, the target base station performs RAN slice re-mapping, the target base station sends a slice re-mapping request to the core network, and the core network performs RAN slice re-mapping and sends a response message to the target base station. The target base station sends a Handover Request acknowledge message to the source base station to complete the handover.

Method 3: Slice Re-Mapping By The Target Base Station (Embodiment 7)

The source base station sends a Handover Request message to the target base station, the target base station performs RAN slice re-mapping, and the target base station sends a Handover Request acknowledge message to the source base station to complete the handover.

Further, embodiment 8 discloses the method for the target base station to select slice re-mapping slices, which includes: (i) the source base station sending a message carrying the allowed Network Slice Selection Assistance Information (NSSAI) list of the UE to the target base station and (ii) the target base station selecting the re-mapping slice for the UE based on the allowed NSSAI list.

Also, example embodiments 9-13 illustrate how to use 3GPP NR technology to achieve continuity of service.

Example Embodiment 1

When an interface is available between the base stations, the AMF set information can be sent from one base station to another base station directly during a connection setup process. An example of such a case is illustrated with the step-wise signaling process shown in FIG. 2A.

Step 1: The source base station sends the AMF set information when the interface between base stations is established. As shown in the left figure in FIG. 2A, when establishing the interface between base stations (for example, in an Xn setup process), the base station sends the AMF set information supported by the base station to another base station. The AMF set is the identification of the AMF associated with the base station. All the slices supported by AMF in an AMF set are consistent. For example, all the network slices in an AMF set are the same. In some implementations, the AMF set can be a list of AMF sets. An AMF set includes a collection of AMFs that serve a given area and network slice. Multiple AMF Sets may be defined per AMF region and network slice(s).

Step 2: The receiving base station sends the home AMF set information in a response message to the source base station. The home AMF set information is the AMF set associated with the receiving base station. The AMF set information of the source base station and the receiving base station may be same or different.

As a result of this signaling, the source base station determines if one or more resources are available to the UE in a case that the UE is to be served by the receiving base station. In some implementations, determining if one or more resources are available to the UE includes determining whether the source base station and the target/receiving base station belong to the same AF or AMF set.

Example Embodiment 1.1

In a case when the source base station's AMF set information is updated, the source base station can send the updated AMF set information in an interface modification process. An example of such a case is illustrated with the step-wise signaling process shown in FIG. 2B.

Initially, the base station sends the AMF set information when the interface is established. For example, this step can be similar to Step 1 discussed in Embodiment 1.

Figure 2B:
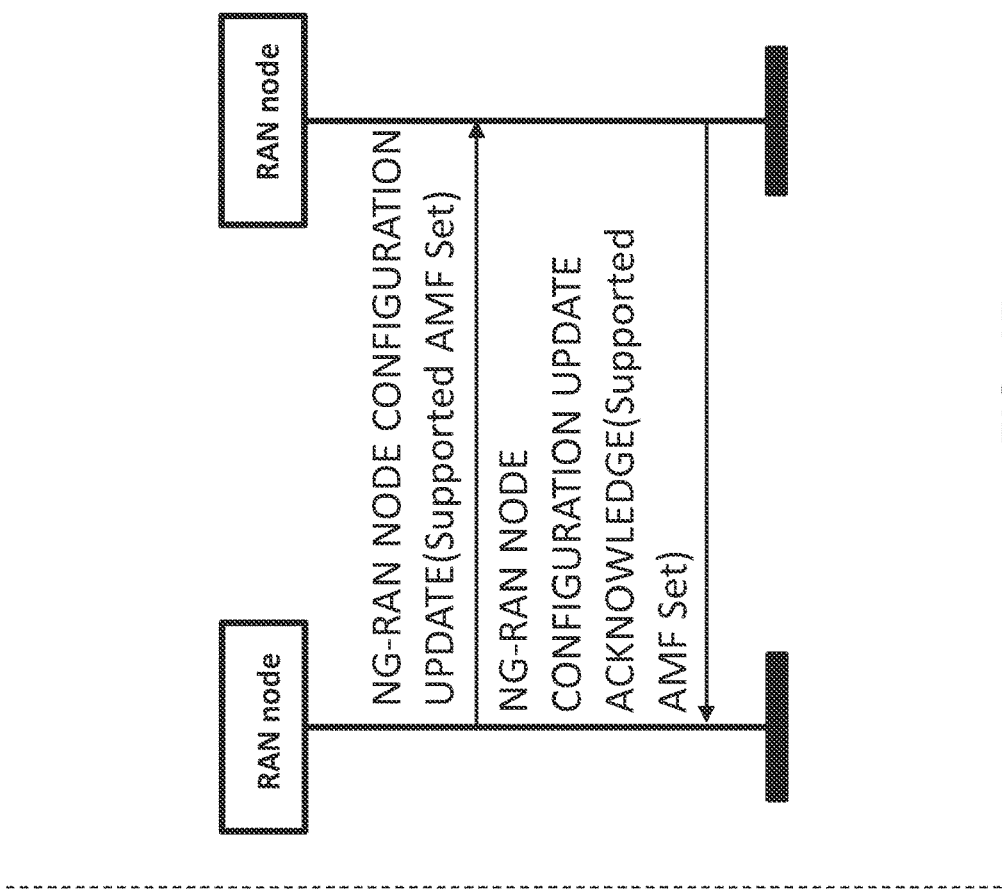
FIG. 2B is a signaling process for supporting continuity of service, in accordance with an example embodiment.
Figure 2A:
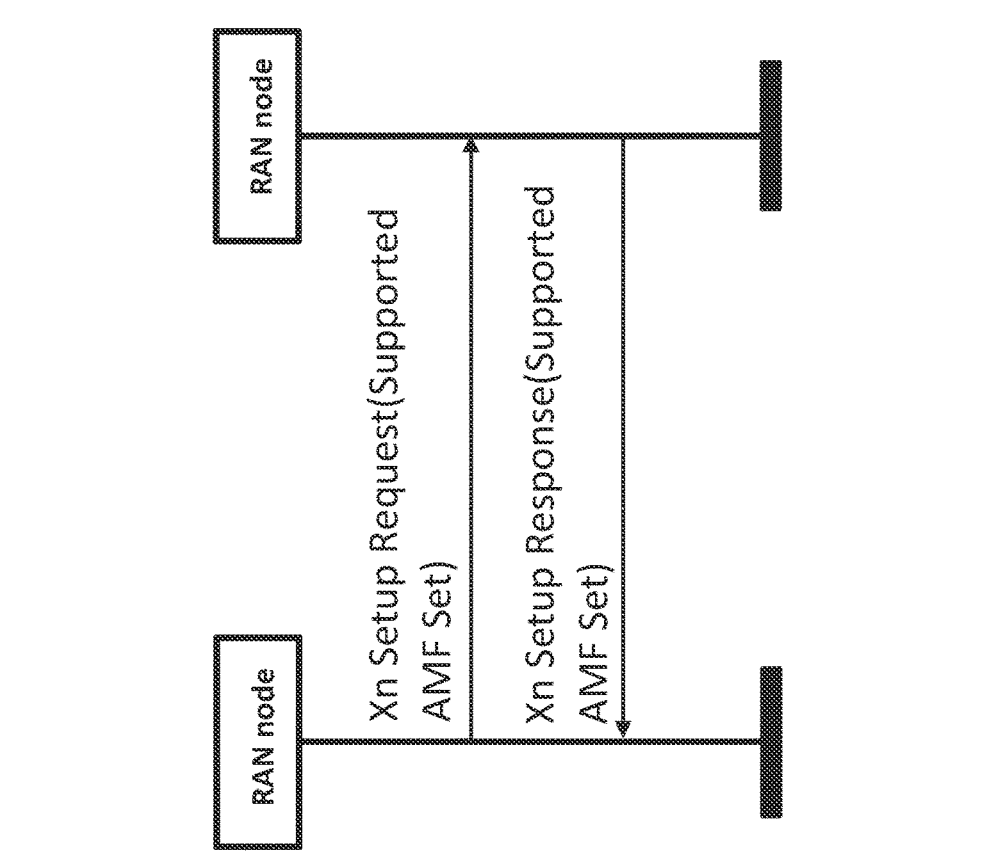
FIG. 2A is a signaling process for supporting continuity of service, in accordance with an example embodiment.

Step 1: As shown in FIG. 2B, when the connection between the base station and the AMF set changes, the base station sends the updated AMF set using the modification process (such as NG-RAN NODE CONFIGURATION UPDATE process) to the receiving base station.

Step 2: The receiving base station sends the updated AMF set information in the response message to the source base station.

As a result of this signaling, the source base station determines if one or more resources are available to the UE in a case that the UE is to be served by the receiving base station. In some implementations, determining if one or more resources are available to the UE includes determining whether the source base station and the target/receiving base station belong to the same AF or AMF set.

Example Embodiment 1.2

When there is no direct interface between the base stations, the core network can be used as an intermediary to send the AMF set information to the receiving base station. An example of such a case is illustrated with the step-wise signaling process shown in FIG. 3.

Figure 3:
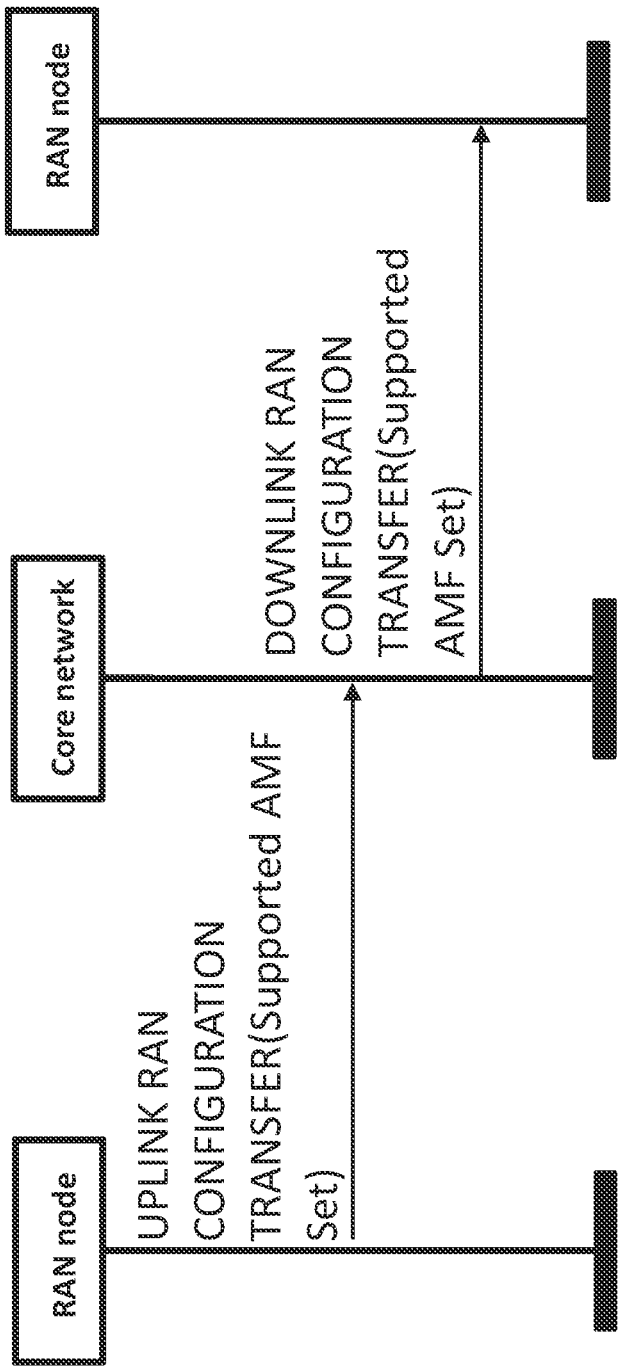
FIG. 3 is a signaling process for supporting continuity of service, in accordance with an example embodiment.

Step 1: The base station sends the AMF set information (associated with the base station) to the core network element. As shown in FIG. 3, the base station sends the associated AMF set information to the core network using the configuration exchange message between the base stations. For example, the AMF set information of the source base station can be included in the uplink RAN CONFIGURATION TRANSFER message as part of the configuration transfer messages process.

Step 2: The core network element relays or conveys the AMF set information of the source base station to the receiving base station. As shown in FIG. 3, the base station sends the associated AMF set information to the receiving base station using the configuration exchange message between the base stations. For example, the AMF set information of the source base station can be included in the downlink RAN CONFIGURATION TRANSFER message as part of the configuration transfer messages process.

As a result of this signaling, the source base station determines resource information available to the UE in a case that the UE is to be served by the receiving base station. For example, the resource information can indicate whether the source base station and the target/receiving base station belong to the same AMF or AMF set.

Example Embodiment 1.3

When there is no direct interface between the base stations, the AMF set information of the source base station can be sent to the receiving base station through the core network in the handover process.

Step 1: The source base station sends a handover request message and sends the associated AMF set information to the core network element. For example, the base station can use the HANDOVER REQUIRED message to carry the AMF set (associated with the source base station) to the target base station.

Step 2: The core network element sends the AMF set information of the source base station to the target base station.

As a result of this signaling, the source base station determines information of resources that can be available to the UE in a case that the UE is to be served by the receiving base station. In some implementations, information of resources can include determining whether the source base station and the target/receiving base station belong to the same AMF or AMF set.

Example Embodiment 2

The slice information supported by the track area (TA) of a base station (e.g., the source base station and/or the target base station) can be used to determine whether the handover belongs to the intra registration area type or the inter registration area type. However, in cases where a direct interface between the base stations is not available, the source base station cannot obtain the slice information supported by the target base station, or vice-versa. To solve this problem, the source base station and the target base station can use core network elements to exchange slice information supported by the TA. An example of such a case is illustrated with the step-wise signaling process shown in FIG. 4.

Figure 4:
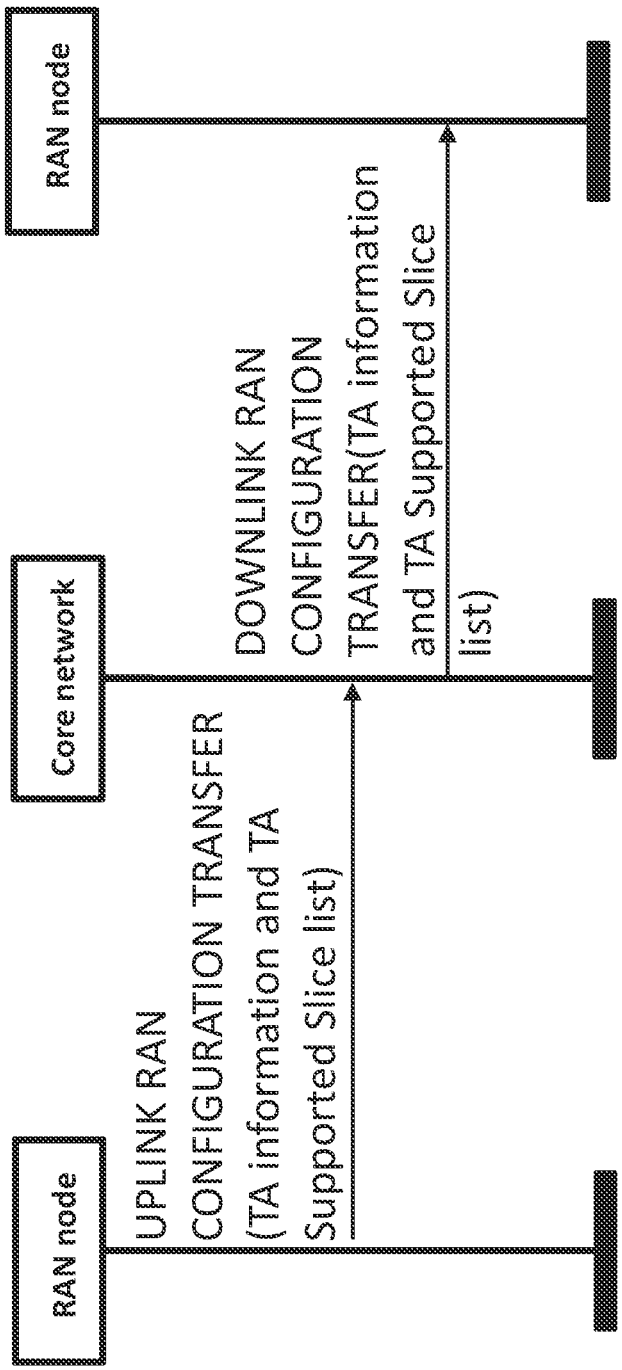
FIG. 4 is a signaling process for supporting continuity of service, in accordance with an example embodiment.

Step 1: The source base station sends the slice information supported by the TA to the core network element. As shown in FIG. 4, the source base station uses the inter-base station configuration exchange message to send the slice information supported by the TA to the core network element. (For example, the slice information supported by the TA can be included in an UPLINK RAN CONFIGURATION TRANSFER message in the Configuration Transfer Messages process).

Step 2: The core network element relays or conveys the slice information supported by the source base station TA to the receiving base station. As shown in FIG. 4, the core network uses the inter-base station configuration exchange message to send the slice information supported by the TA to the receiving base station. (For example, the slice information supported by the TA can be included in a DOWNLINK RAN CONFIGURATION TRANSFER message in the Configuration Transfer Messages process from the core network to the receiving base station.)

As a result of this signaling, the target base station can determine whether the handover belongs to the intra registration area type or the inter registration area type.

Example Embodiment 3

In some embodiments, the base stations can support the RAN-side slice re-mapping functionality, which enables efficient utilization of physical network resources. For example, a base station can use a RAN Slice re-mapping Indicator field to indicate whether the base station supports the RAN-side slice re-mapping functionality. The RAN slice re-mapping indicator information can include one or more fields based on the following information attributes:

1: Instruct a base station to support slice re-mapping functionality
2: Indicate a list of slices supported by the base station TA that can be re-mapping slices
3: Instruct the source base station to send the allowed Network Slice Selection Assistance Information (NSSAI) list of the user equipment (UE)
4: Instruct the base station to support slice lists through pre-configuration of re-mapping. (For example, the source base station may directly handover the UE to the target without depending on re-mapping information assistance such as the allowed NSSAI list of the UE.

Rather, the source base station can use pre-configured tables stored in the source base station. The pre-configured tables can include details of how slices are mapped, and which other slice(s) is/are mapped to a given slice.)

5: Indicate that the slice resources supported by the base station TA are insufficient An example of a case where base stations support RAN-side slice re-mapping functionality is illustrated with the step-wise signaling process shown in FIGS. 5A and 5B.

Figures 5A, 5B:
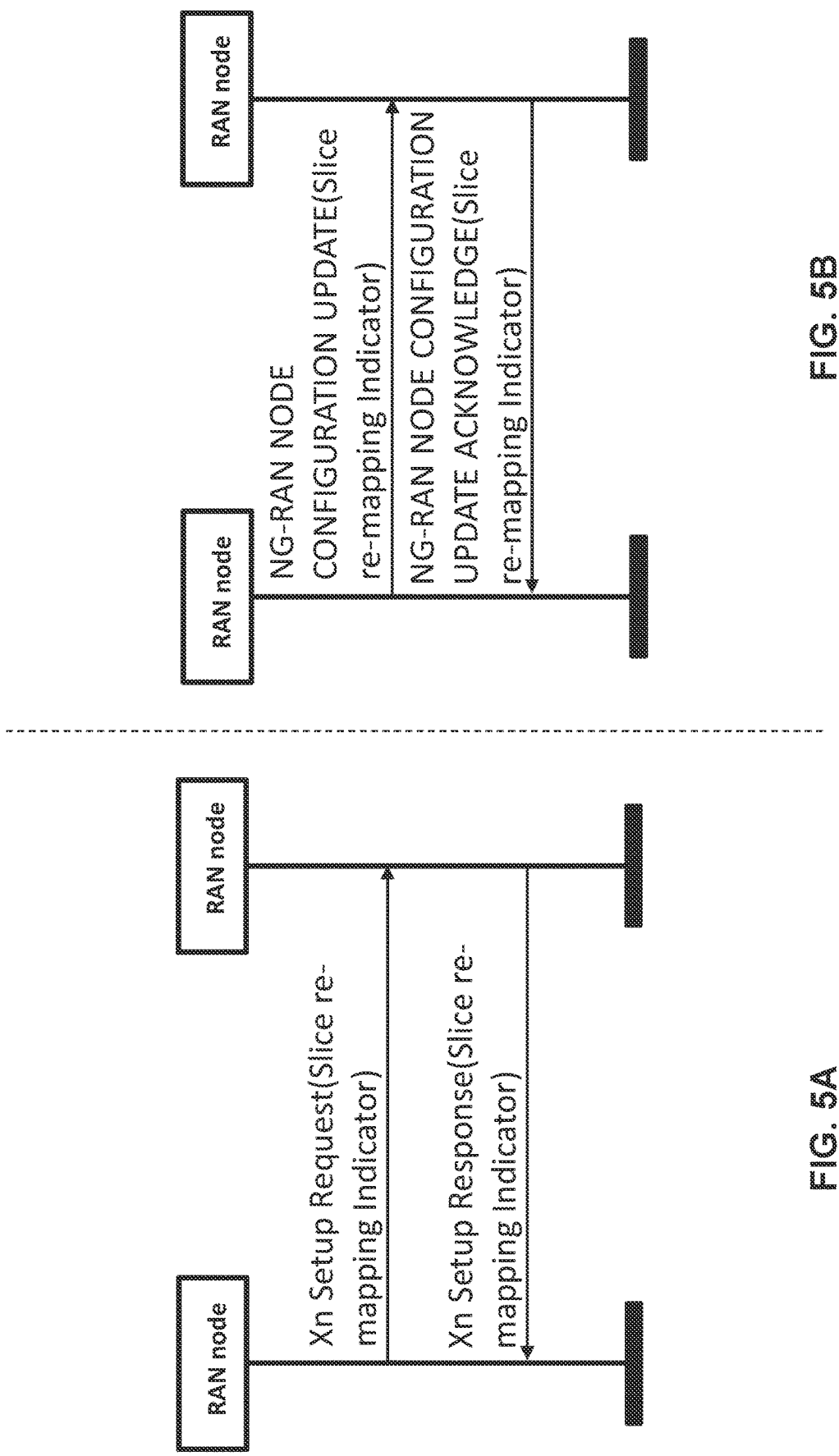
FIG. 5A is a signaling process for supporting continuity of service, in accordance with an example embodiment.
FIG. 5B is a signaling process for supporting continuity of service, in accordance with an example embodiment.

Step 1: The source base station sends its associated RAN Slice re-mapping Indicator when the connection interface is established or modified. As shown in FIG. 5A, the source base station sends the RAN Slice re-mapping Indicator information when establishing the interface between the base stations (for example, during the Xn setup process).

Step 2: The receiving base station sends the RAN Slice re-mapping Indicator information in a response message as shown in FIG. 5A.

As shown in FIG. 5B, when the base station's AMF set changes, the changed base station uses a modification process (such as the AMF CONFIGURATION UPDATE process) to send the updated RAN Slice re-mapping Indicator information. In response, the receiving base station sends the updated RAN Slice re-mapping Indicator information in the response message to the source base station.

As a result of this signaling, the source base station can determine resource information indicating whether the target base station supports RAN-side slice re-mapping functionality.

Example Embodiment 4

In some embodiments, the core network can support slice re-mapping functionality. A base station may not have knowledge of whether (or not) the core network supports the slice re-mapping functionality. An example of such a case is illustrated with the step-wise signaling process shown is illustrated in FIGS. 6A and 6B.

Step 1: The base station initiates interface establishment between base station and core network. As shown in FIG. 6A, the base station initiates the NG interface establishment. For example, the source Base Station can request for slice re-mapping indicator information of the core network in the NG interface establishment message.

Step 2: The core network element sends a response message with the slice re-mapping Indicator information.

Figure 6B:
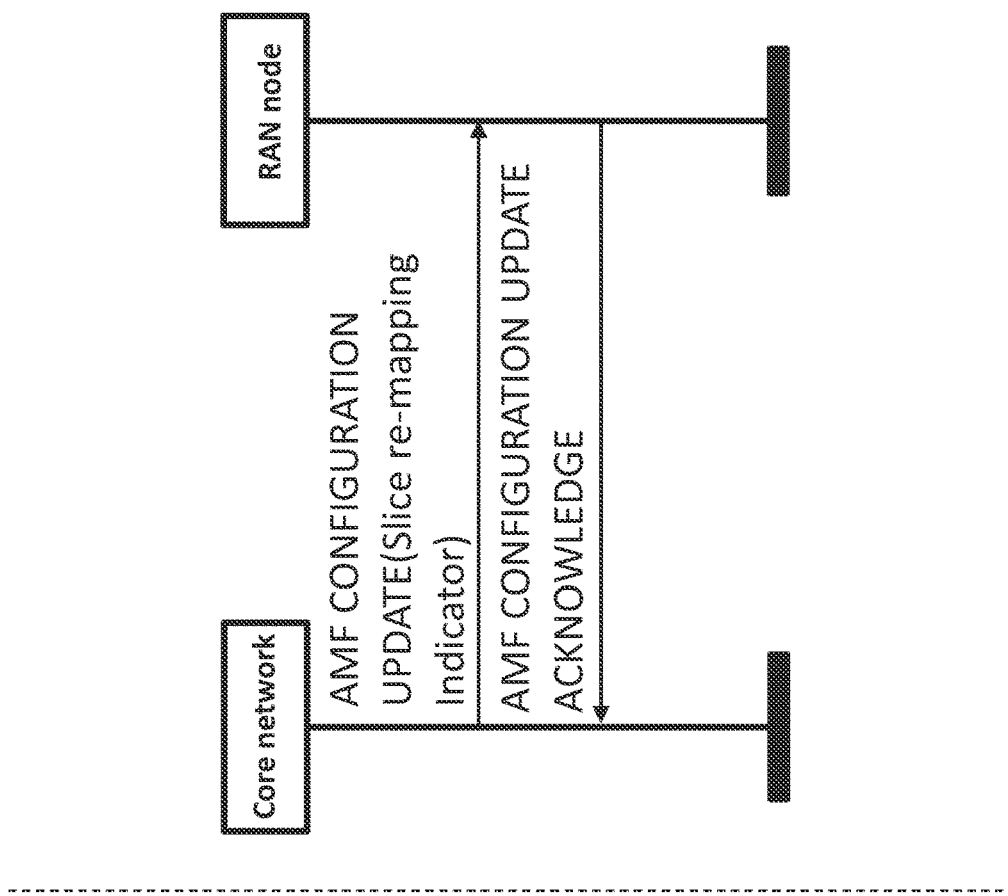
FIG. 6B is a signaling process for supporting continuity of service, in accordance with an example embodiment.
Figure 6A:
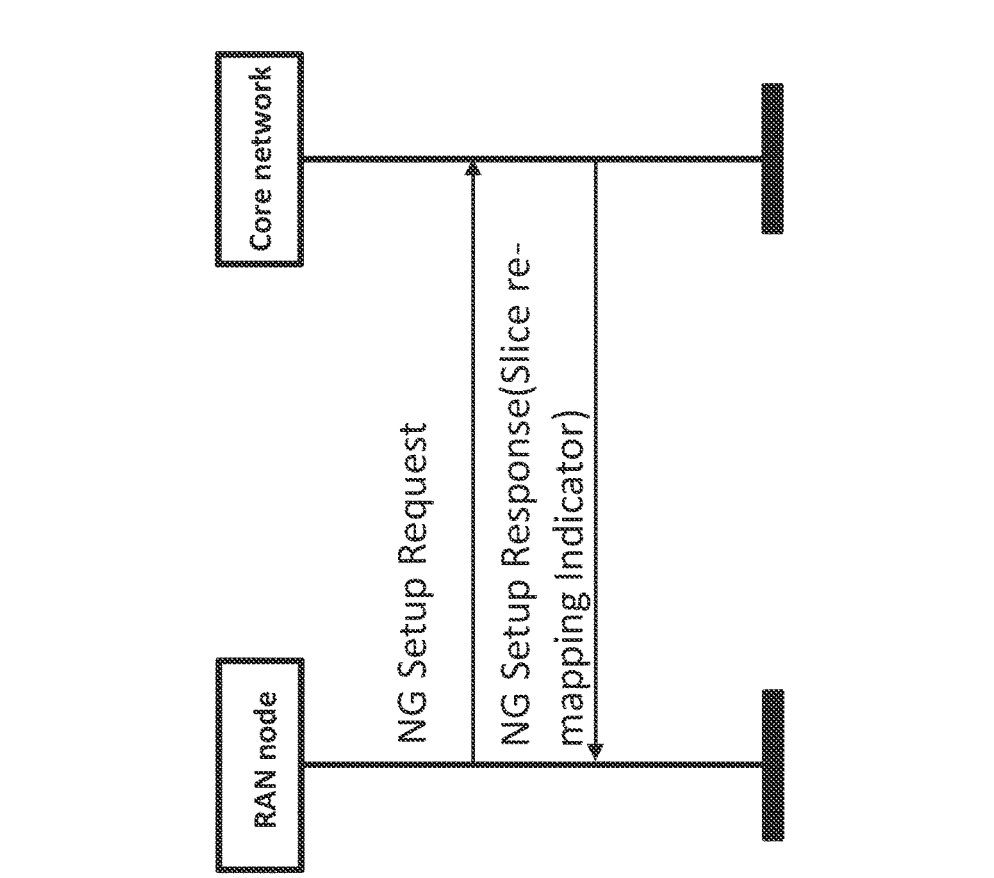
FIG. 6A is a signaling process for supporting continuity of service, in accordance with an example embodiment.

In scenarios, when the slice re-mapping indicator information of the core network changes or gets modified, the updated Slice re-mapping Indicator is included in an interface modification process (for example, during the AMF CONFIGURATION UPDATE process as shown in FIG. 6B). In response, the base station sends AMF CONFIGURATION UPDATE ACKNOWLEDGE message as shown in FIG. 6B.

In some implementations, the slice re-mapping indicator information includes at least one of the following attributes:

1: Instructions for the core network to support slice re-mapping

2: Indication of a list of slices supported by the core network that can be available for slice re-mapping.

As a result of this signaling, the source base station can determine resource information indicating whether the core network supports RAN-side slice re-mapping functionality.

Example Embodiment 5

Figure 7:
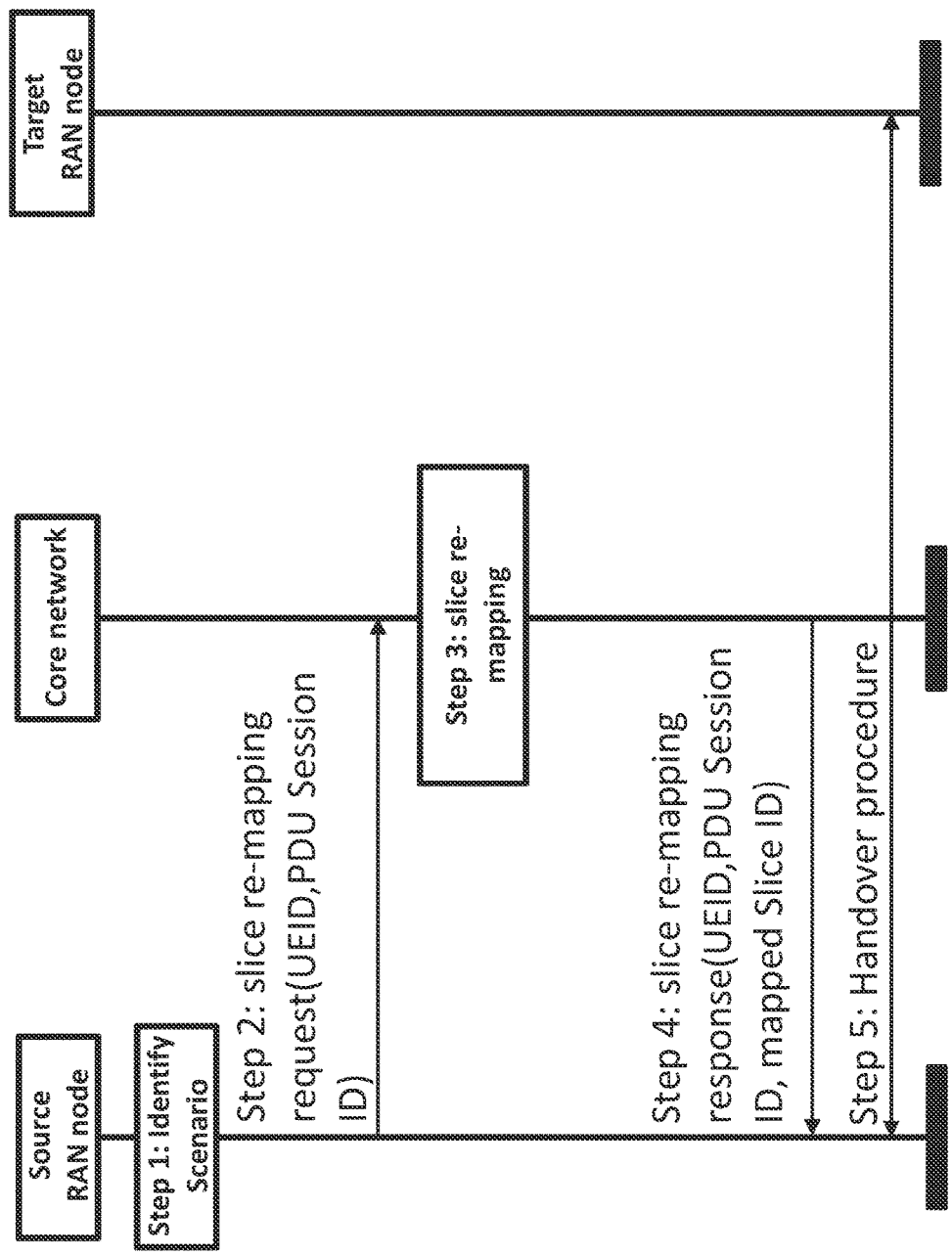
FIG. 7 is a signaling process for supporting continuity of service, in accordance with an example embodiment.

In some embodiments, the source base station performs a handover after slice re-mapping is performed by the core network. An example of this case is illustrated with the step-wise signaling process shown in FIG. 7.

Step 1: The source base station identifies the mobility scenario (e.g., using the methods discussed in embodiments 1-4). For example, the source base station determines whether a service (e.g., a PDU session) of the served UE can be handed over to the target base station.

Step 2: The source base station sends a slice re-mapping request (e.g., including the UE ID, PDU Session ID) to the core network to perform slice re-mapping for the UE. For example, the slice re-mapping request message can be a part of the PDU SESSION RESOURCE MODIFY INDICATION message of the NG interface.

Step 3: The core network performs slice re-mapping for the service of the UE.

Step 4. The core network notifies the source base station of the outcome of slice re-mapping, which includes the mapped slice ID. The source base station updates the slice information of the UE service after receiving the response message from the core network.

Step 5: The source base station switches (e.g., a handover procedure) the UE to the target base station. Further, the handover procedure can include a handover request and a handover acknowledge steps.

Example Embodiment 6

Figure 8:
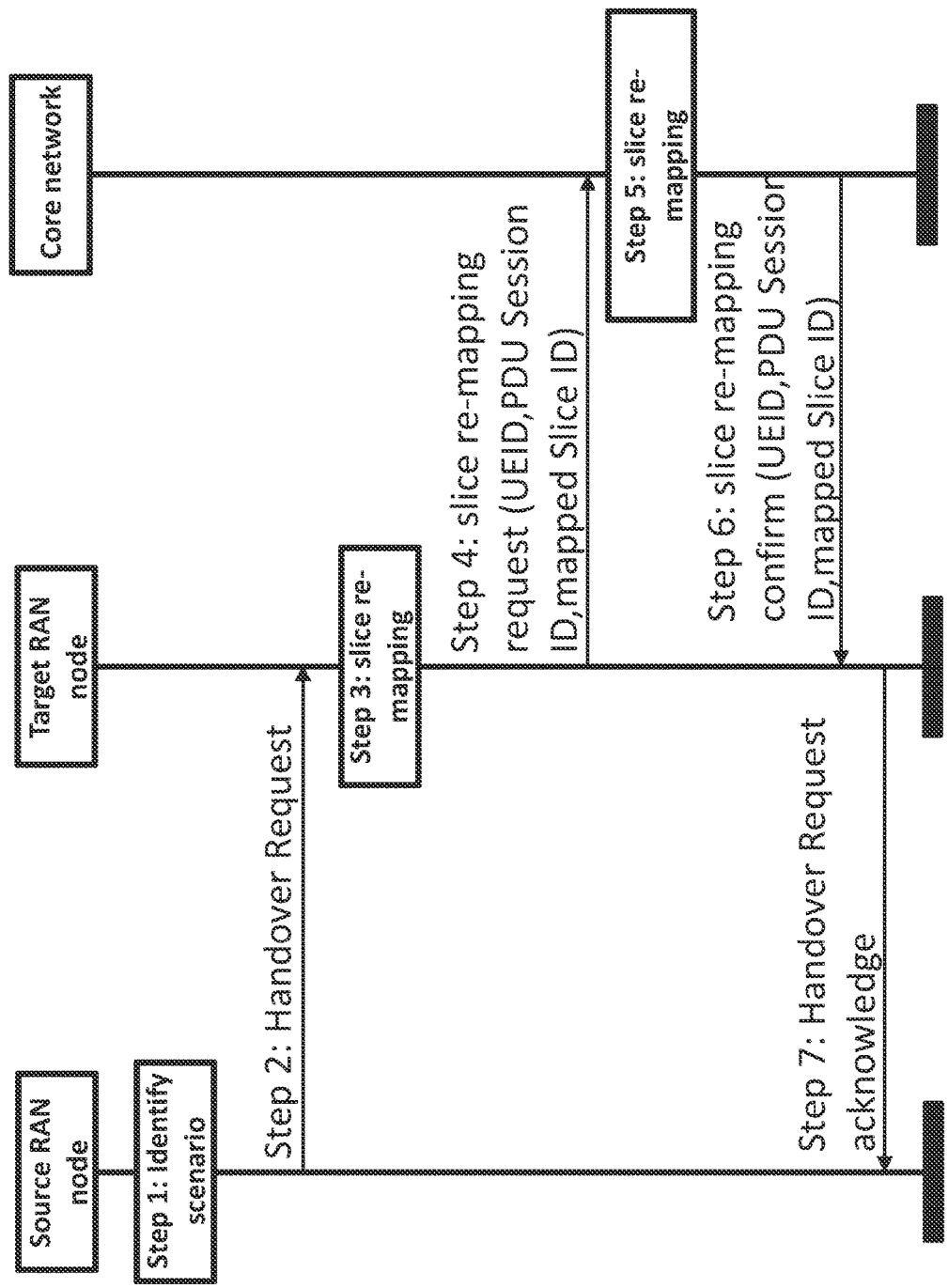
FIG. 8 is a signaling process for supporting continuity of service, in accordance with an example embodiment.

In some embodiments, the target base station and the core network perform slice re-mapping. An example of this case is illustrated with the step-wise signaling process shown in FIG. 8.

Step 1: The source base station identifies the mobility scenario (e.g., using the methods discussed in embodiments 1-4). For example, the source base station determines whether a service (e.g., a PDU session) of the served UE can be handed over to the target base station.

Step 2: The source base station sends a Handover Request message to the target base station.

Step 3: The target base station performs RAN slice re-mapping (e.g., using the methods discussed in embodiments 1-4). For example, the target base station selects a suitable slice for re-mapping (e.g., as disclosed in embodiment 8).

Step 4: The target base station sends a slice re-mapping request (e.g., including UE ID, PDU Session ID, mapped Slice ID) to the core network. The mapped Slice ID corresponds to the slice selected by the target base station.

Step 5: The core network performs slice re-mapping. For example, the core network's slice re-mapping is for verifying that the slice (e.g., the mapped slice ID) selected by the target base station is a suitable slice for the handover of the UE. For example, the verification can include determining that the mapped slice ID is suitable from the perspective of the core network and accordingly changing the UE's service traffic (e.g., PDU Session ID) to the mapped slice ID selected by the target base station.

Step 6: Based on the verification, the core network sends a response message to the target base station confirming the slice selected by the target base station.

Step 7: Upon receiving the response message from the core network, the target base station sends a Handover Request acknowledge message to the source base station to complete the handover.

Example Embodiment 7

Figure 9:
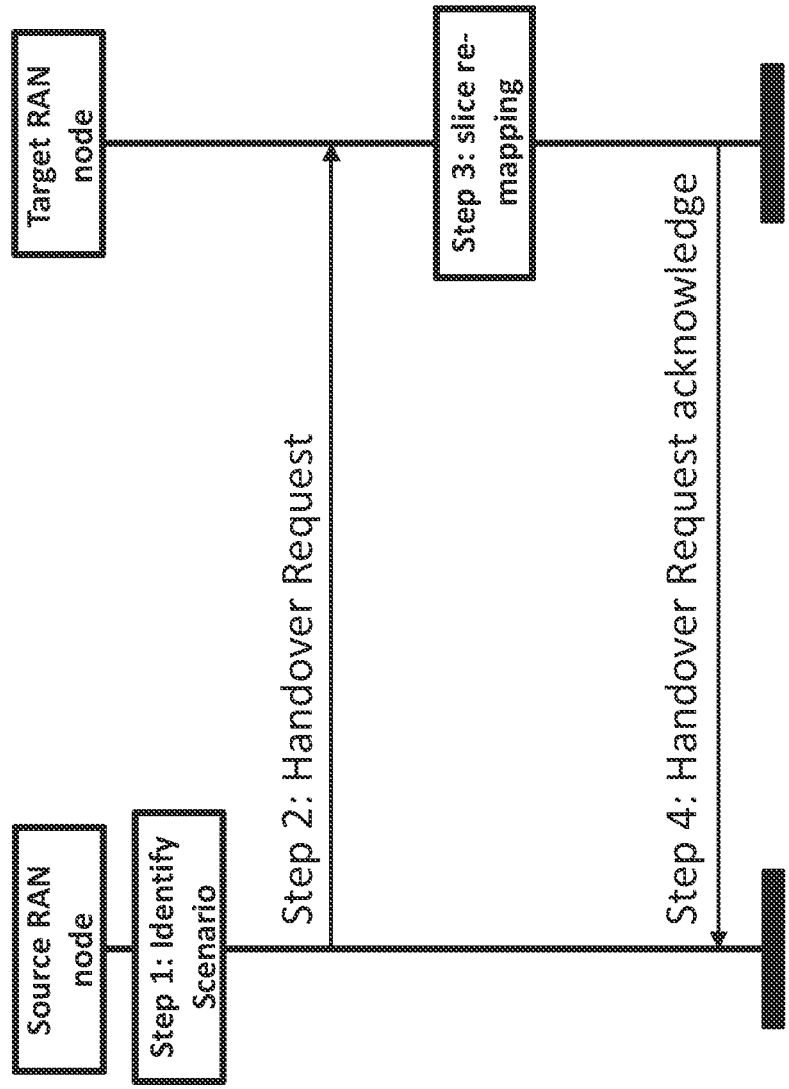
FIG. 9 is a signaling process for supporting continuity of service, in accordance with an example embodiment.

In some embodiments, the target base station performs slice re-mapping. An example of this case is illustrated with the step-wise signaling process shown in FIG. 9.

Step 1: The source base station identifies the mobility scenario (e.g., using the methods discussed in embodiments 1-4). For example, the source base station determines whether a service (e.g., a PDU session) of the served UE can be handed over to the target base station.

Step 2: The source base station sends a Handover Request message to the target base station.

Step 3: The target base station performs RAN slice re-mapping. The target base station determines that RAN slice re-mapping needs to be performed (e.g., as discussed in embodiments 1-4). For example, the target base station selects a suitable slice for re-mapping (e.g., as disclosed in Embodiment 8).

Step 4: The target base station sends a Handover Request acknowledge message to the source base station to complete the handover.

Example Embodiment 8

Figure 10:
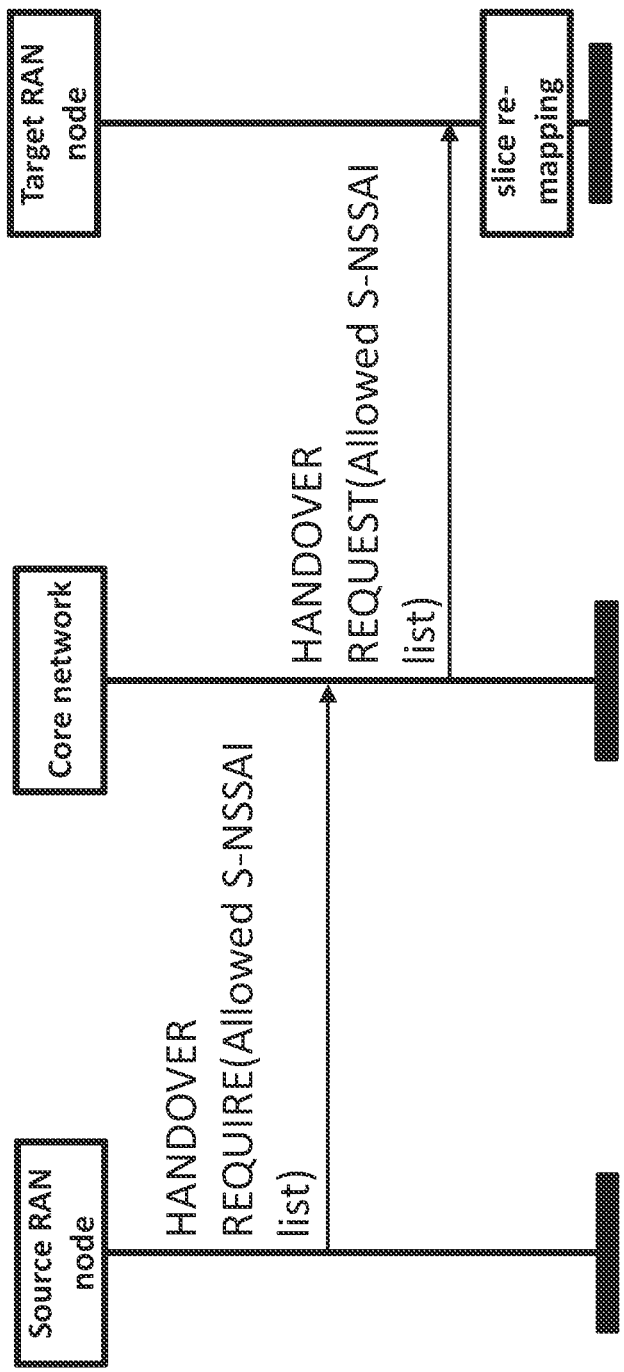
FIG. 10 is a signaling process for supporting continuity of service, in accordance with an example embodiment.

In some embodiments, the target base station selects the re-mapping slice(s) for the UE. An example of this case is illustrated with the step-wise signaling process shown in FIG. 10.

Step 1: The source base station sends a message carrying the allowed NSSAI parameter list of the UE to the target base station. For example, the allowed NSSAI list of the UE can be included in the Handover Request message. The message is forwarded to the target base station via the core network. The allowed NSSAI list can include parameters indicating a slice type and a slice differentiator (which differentiates among slices of the same type). The UE/core network can provide the allowed NSSAI list initially to the source base station.

Step 2: The target base station selects the re-mapping slice for the UE, based on the allowed NSSAI list and information identifying the mobility scenario (e.g., using the methods discussed in embodiments 1-4) of the UE.

Step 3: The target base station selects a suitable slice as the re-mapping slice of the UE service according to the information obtained (e.g., using the methods discussed in embodiments 1-4), combined with the allowed NSSAI list supported by the UE.

Accordingly, a UE handover occurs from the source base station to the target base station, after slice re-mapping is performed by the target base station. The target base station performs slice selection, based on the allowed NSSAI list of the UE and the mobility scenario information.

Example Embodiment 8.1

In some embodiments, the target base station selects the re-mapping slice(s) for the UE and the core network is not involved in the signaling that results in handover of the UE.

Figure 11:
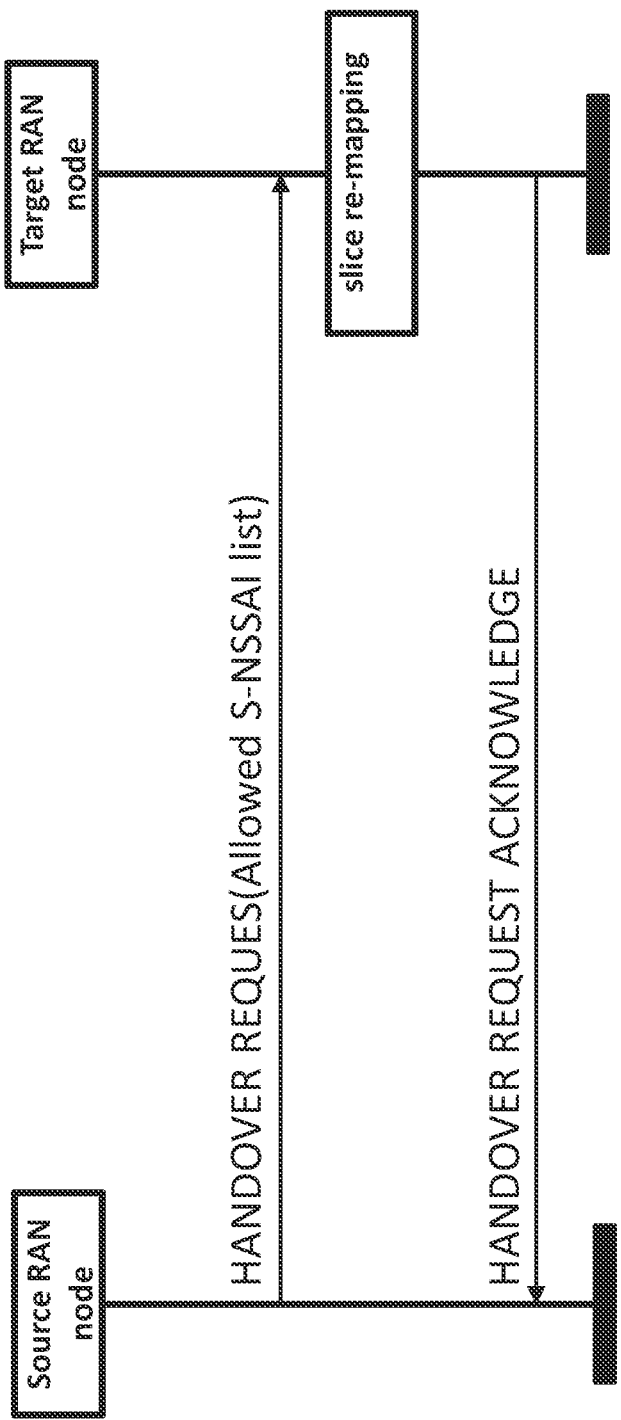
FIG. 11 is a signaling process for supporting continuity of service, in accordance with an example embodiment.

An example of this case is illustrated with the step-wise signaling process shown in FIG. 11.

Step 1: The source base station sends a message carrying the allowed NSSAI list (e.g., a list of parameters) of the UE to the target base station. For example, the allowed NSSAI list can be included in a handover request message.

Step 2: The target base station selects the re-mapping Slice for the UE. For example, the target base station selects a suitable slice as the re-mapping slice of the UE (e.g., using the methods described in embodiments 1-4) combined with the allowed NSSAI list supported by the UE.

Step 3: The target base station sends a response message to the source base station. For example, the Handover Request Acknowledge message.

Example Embodiment 9

Figure 12:
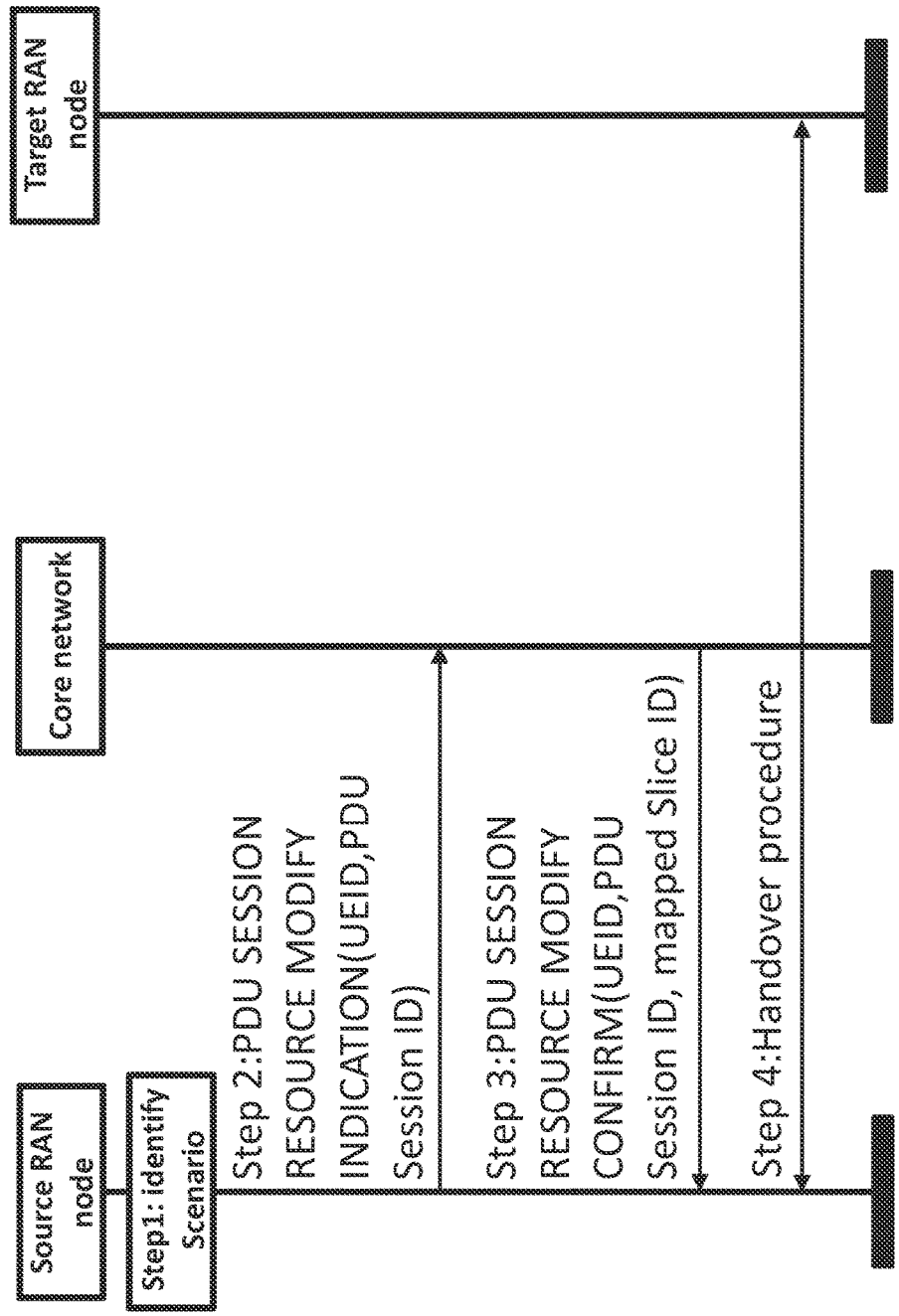
FIG. 12 is a signaling process for supporting continuity of service, in accordance with an example embodiment.

When the mobility scenario corresponds to an intra registration area scenario, the source base station and the target base station can use Xn based Handover, and the core network also supports the slice re-mapping functionality. An example of this case is illustrated with the step-wise signaling process shown in FIG. 12.

Step 1: The source base station identifies the mobility scenario using the slice re-mapping function. For example, if the TA used by the source base station and the target base station are consistent through the measurement report of the UE, the source base station determines this handover belongs to the intra registration area scenario. The source base station decides to use Xn based handover (e.g., discussed in embodiment 3). For example, the source base station can determine (e.g., based on the method discussed in embodiment 3) that the current service use slice of the UE (e.g., slice 1) is in a state of insufficient resources in the target base station. Further, the source base station can determine (e.g., based on the method discussed in embodiment 4) that the core network supports slice re-mapping functionality and can support re-mapping of the slice currently used by the UE.

Step 2: To request the core network to perform slice re-mapping for the UE, the source base station can determine to support the slice re-mapping method discussed in embodiment 5. For example, the source base station sends a PDU SESSION RESOURCE MODIFY INDICATION request to the core network to perform slice re-mapping for the UE.

Step 3: The core network performs slice re-mapping for the service of the UE and notifies the source base station of the result of the re-mapping. The source base station updates the UE service slice on the source base station after receiving the PDU SESSION RESOURCE MODIFY CONFIRM message. For example, the message can indicate that the UE service slice 1 with insufficient resources is to be updated to slice 2.

Step 4: The source base station switches the UE to the target base station to ensure service continuity. At the target base station, e.g., slice 1 is insufficient in resources but slice 2 has sufficient resources.

Example Embodiment 10

When the mobility scenario corresponds to an intra registration area scenario, the source base station and the target base station use Xn based Handover, and both the core network and the target base station support slice re-mapping functionality.

Step 1: The source base station identifies the mobility scenario using the slice re-mapping function. For example, if the TA used by the source base station and the target base station are consistent through the measurement report of the UE, the source base station determines this handover belongs to the intra registration area scenario. The source base station decides to use Xn based handover (e.g., discussed in embodiment 3). For example, the source base station can determine (e.g., based on the method discussed in embodiment 3) that the current service use slice of the UE (e.g., slice 1) is in a state of insufficient resources in the target base station. As a result, the source base station can determine that the target base station needs the allowed S-NSSAI list information of the UE. Further, the source base station can determine (e.g., based on the method discussed in embodiment 6) that the target base station supports slice re-mapping functionality and can support re-mapping of the slice currently used by the UE.

Step 2: The source base station sends a Handover Request message to the target base station. The message can include the allowed S-NSSAI list information of the UE.

Step 3: The target base station performs RAN slice re-mapping. As a result, the target base station determine that the mobility scenario corresponds to an intra registration area type handover (e.g., based on the method discussed in embodiment 1). Also, the target base station determines that the slice resources of the target base station are insufficient. Accordingly, the target base station selects (e.g., based on the method discussed in embodiment 8) a suitable slice for re-mapping. Further, the target base station can determine (e.g., based on the method discussed in embodiment 4) that the core network element supports slice re-mapping. For example, the target base station can determine that the slice list from the core network and the allowed S-NSSAI list information of the UE have one or more common slices. (The target base station can determine/acquire the slice list from the core network based on its connection to the core network.) Further, the target base station can select a slice from the one or more common slices in the slice list from the core network and the allowed S-NSSAI list information of the UE.

Step 4: The target base station sends a slice re-mapping request to the core network. In some implementations, the message may be a PATH switch message of the NG interface, and the message can include the re-mapping slice information (from the one or more common slices) selected by the target base station.

Step 5: The core network element performs slice re-mapping and sends a response message to the target base station. The message may be a PATH switch acknowledge message of the NG interface.

Step 6: The target base station sends a Handover Request acknowledge message to the source base station to complete the handover.

Example Embodiment 11

When the mobility scenario corresponds to an intra registration area scenario, the source base station and the target base station use Xn based Handover and slice re-mapping functionality is supported by the target base station.

Step 1: The source base station identifies the mobility scenario using the slice re-mapping function. For example, if the TA used by the source base station and the target base station are consistent through the measurement report of the UE, the source base station determines this handover belongs to the intra registration area scenario. The source base station decides to use Xn based handover (e.g., discussed in embodiment 3). For example, the source base station can determine (e.g., based on the method discussed in embodiment 3) that the current service use slice of the UE (e.g., slice 1) is in a state of insufficient resources in the target base station. As a result, the source base station can determine that the target base station needs the allowed S-NSSAI list information of the UE. Further, the source base station can determine (e.g., based on the method discussed in embodiment 3) that the target base station supports slice re-mapping functionality and can support re-mapping of the slice currently used by the UE.

Step 2: The source base station sends a Handover Request message to the target base station. The message can include the allowed S-NSSAI list information of the UE.

Step 3: The target base station performs RAN slice re-mapping. As a result, the target base station determine that the mobility scenario corresponds to an intra registration area type handover (e.g., based on the method discussed in embodiment 1). Also, the target base station determines that the slice resources of the target base station are insufficient. The target base station cannot determine whether the core network supports slice re-mapping or lacks resources for supporting slice re-mapping. Accordingly, the target base station selects (e.g., based on the method discussed in embodiment 8) a suitable slice with sufficient resources for re-mapping.

Step 4: The target base station sends a Handover Request acknowledge message to the source base station to complete the handover.

Example Embodiment 12

When the mobility scenario corresponds to an intra registration area scenario, the source base station and the target base station use NG based Handover and the slice re-mapping functionality is supported by the target base station.

Step 1: The source base station identifies the mobility scenario using the slice re-mapping function. For example, if the TA used by the source base station and the target base station are consistent through the measurement report of the UE, the source base station determines this handover belongs to the intra registration area scenario. The source base station decides to use NG based handover based on 3GPP technology. The source base station can determine that the target base station needs the allowed S-NSSAI list information of the UE (e.g., based on the method discussed in embodiment 3). Further, the source base station can determine (e.g., based on the method discussed in embodiment 7) that the target base station supports slice re-mapping functionality and can support re-mapping of the slice currently used by the UE.

Step 2: The source base station sends a Handover Required message to the core network. The message can include the allowed S-NSSAI list information of the UE and/or the AMF set information of the source base station.

Step 3: The core network sends a Handover Request message to the target base station. The message can include the allowed S-NSSAI list information of the UE and/or the AMF set information of the source base station connection.

Step 3: The target base station performs RAN slice re-mapping. As a result, the target base station determine that the mobility scenario corresponds to an intra registration area type handover (e.g., based on the method discussed in embodiment 1). Also, the target base station determines that the slice resources of the target base station are insufficient. The target base station cannot determine whether the core network supports slice re-mapping or lacks resources for supporting slice re-mapping. Accordingly, the target base station selects (e.g., based on the method discussed in embodiment 8) a suitable slice with suitable resources for re-mapping.

Step 4: The target base station sends a Handover Request acknowledge message to the core network.

Step 5: The core network sends a HANDOVER REQUEST ACKNOWLEDGE message to the source base station to complete the handover.

Example Embodiment 13

When the mobility scenario corresponds to an inter registration area scenario, the source base station and the target base station use Xn based Handover and the slice re-mapping is supported by the target base station.

Step 1: The source base station identifies the mobility scenario using the slice re-mapping function. For example, if the TA used by the source base station and the target base station are inconsistent through the measurement report of the UE, the source base station determines this handover belongs to the inter registration area scenario. The source base station decides to use Xn based handover (e.g., discussed in embodiment 3). For example, the source base station can determine (e.g., based on the method discussed in embodiment 3) that the current service use slice of the UE (e.g., slice 1) is not supported by the target base station. As a result, the source base station can determine that the target base station needs the allowed S-NSSAI list information of the UE.

Step 2: The source base station sends a Handover Request message to the target base station. The message can include the allowed S-NSSAI list information of the UE.

Step 3: The target base station performs RAN slice re-mapping. As a result, the target base station determine that the mobility scenario corresponds to an inter registration area type handover (e.g., based on the method discussed in embodiment 1). Also, the target base station determines that it does not support the slice used by the UE service. The target base station cannot determine whether the core network supports slice re-mapping or lacks resources for supporting slice re-mapping. Accordingly, the target base station selects (e.g., based on the method discussed in embodiment 8) a suitable slice for re-mapping.

Step 4: The target base station sends a Handover Request acknowledge message to the source base station to complete the handover.

Step 5: The UE initiates the Registration update process.

Example System Implementations

Figure 13:
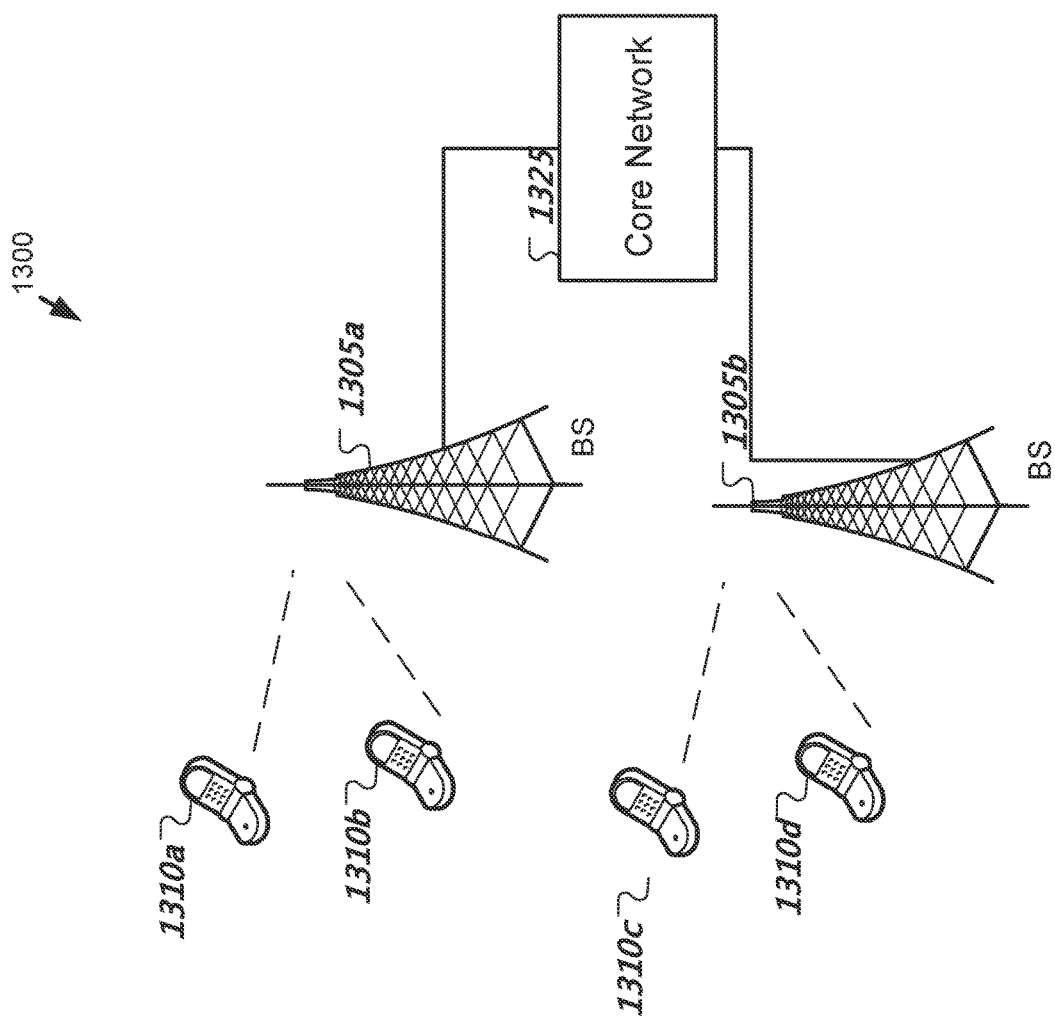
FIG. 13 shows an example of a wireless communication system where techniques in accordance with one or more embodiments of the present technology can be applied.

FIG. 13 shows an example of a wireless communication system where techniques in accordance with one or more embodiments of the present technology can be applied. A wireless communication system 1300 can include one or more base stations (BSs) 1305a, 1305b, one or more wireless devices 1310a, 1310b, 1310c, 1310d, and a core network 1325. A base station 1305a, 1305b can provide wireless service to wireless devices 1310a, 1310b, 1310c and 1310d in one or more wireless sectors. In some implementations, a base station 1305a, 1305b includes directional antennas to produce two or more directional beams to provide wireless coverage in different sectors.

The core network 1325 can communicate with one or more base stations 1305a, 1305b. The core network 1325 provides connectivity with other wireless communication systems and wired communication systems. The core network may include one or more service subscription databases to store information related to the subscribed wireless devices 1310a, 1310b, 1310c, and 1310d. A first base station 1305a can provide wireless service based on a first radio access technology, whereas a second base station 1305b can provide wireless service based on a second radio access technology. The base stations 1305a and 1305b may be co-located or may be separately installed in the field according to the deployment scenario. The wireless devices 1310a, 1310b, 1310c and 1310d can support multiple different radio access technologies. In some embodiments, the base stations 1305a, 1305b may be configured to implement some techniques described in the present document. The wireless devices 1310a to 1310d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 14:
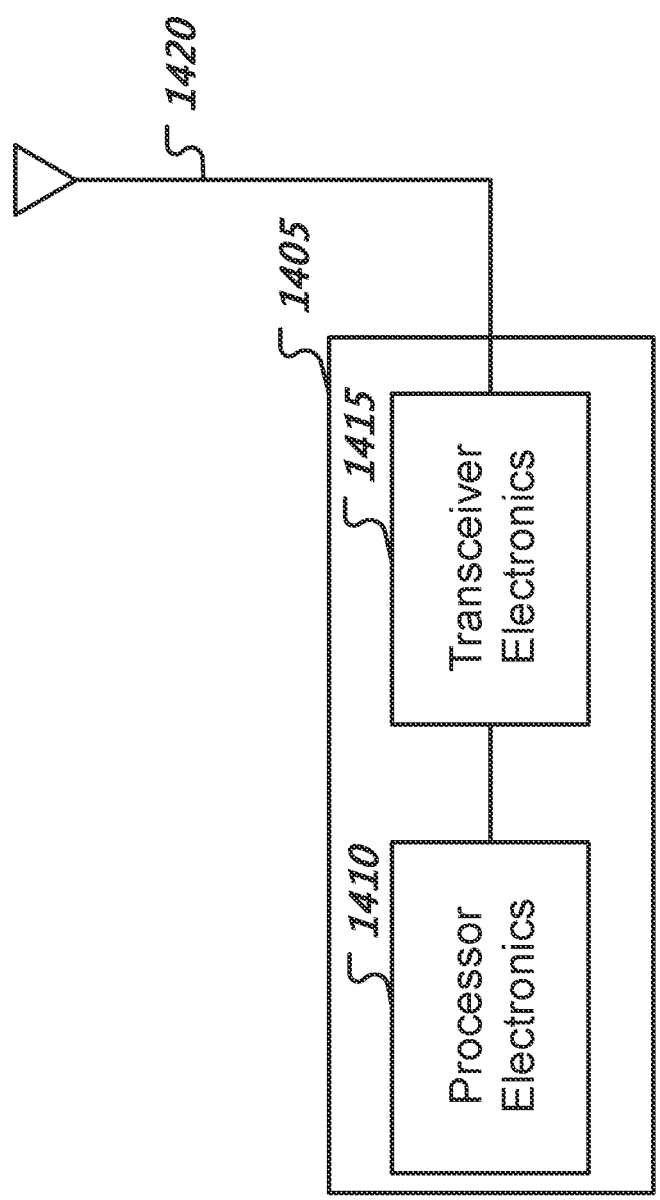
FIG. 14 is a block diagram representation of a portion of a hardware platform.

FIG. 14 is a block diagram representation of a portion of a hardware platform. A hardware platform 1405 such as a network node or a base station or a mobile device (or UE) can include processor electronics 1410 such as a microprocessor that implements one or more of the techniques presented in this document. The hardware platform 1405 can include transceiver electronics 1415 to send and/or receive wired or wireless signals over one or more communication interfaces such as antenna 1420 or a wireline interface. The hardware platform 1405 can implement other communication interfaces with defined protocols for transmitting and receiving data. The hardware platform 1405 can include one or more memories (not explicitly shown) configured to store information such as data and/or instructions. In some implementations, the processor electronics 1410 can include at least a portion of the transceiver electronics 1415. In some embodiments, at least some of the disclosed techniques, modules or functions, a central node, a distributed node, a terminal or network nodes are implemented using the hardware platform 1405.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Figure 15:
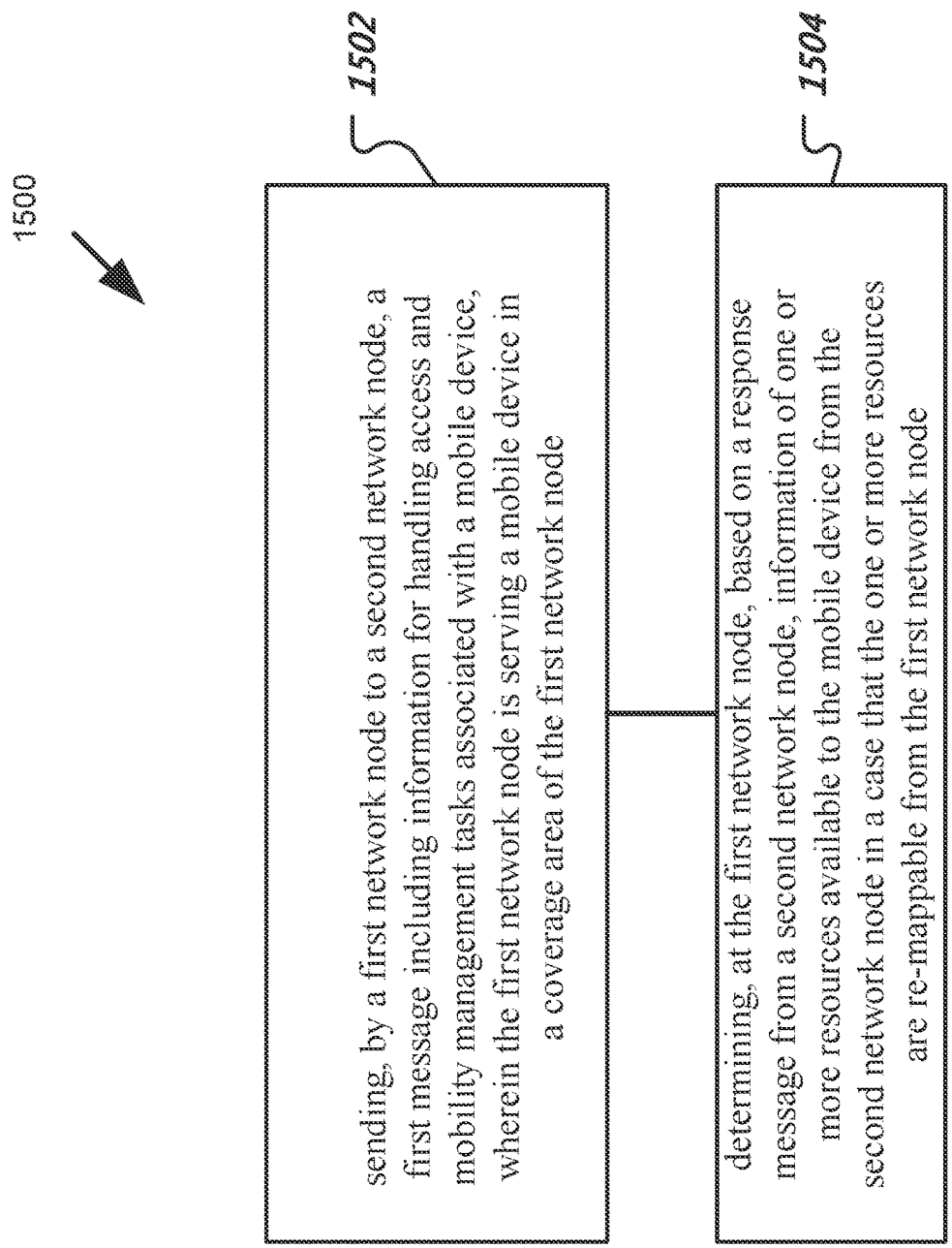
FIG. 15 illustrates a flowchart of an example method for supporting continuity of service.

FIG. 15 illustrates a flowchart of an example method for supporting continuity of service. For example, steps of this flowchart are discussed with respect to the source base station in embodiments 1, 3, and 4 of this document. At step 1502, the process sends, by a first network node to a second network node, a first message including information for handling access and mobility management tasks associated with a mobile device, wherein the first network node is serving a mobile device in a coverage area of the first network node. At step 1504, the process determines, at the first network node, based on a response message from a second network node, information of one or more resources available to the mobile device from the second network node in a case that the one or more resources are re-mappable from the first network node.

Figure 16:
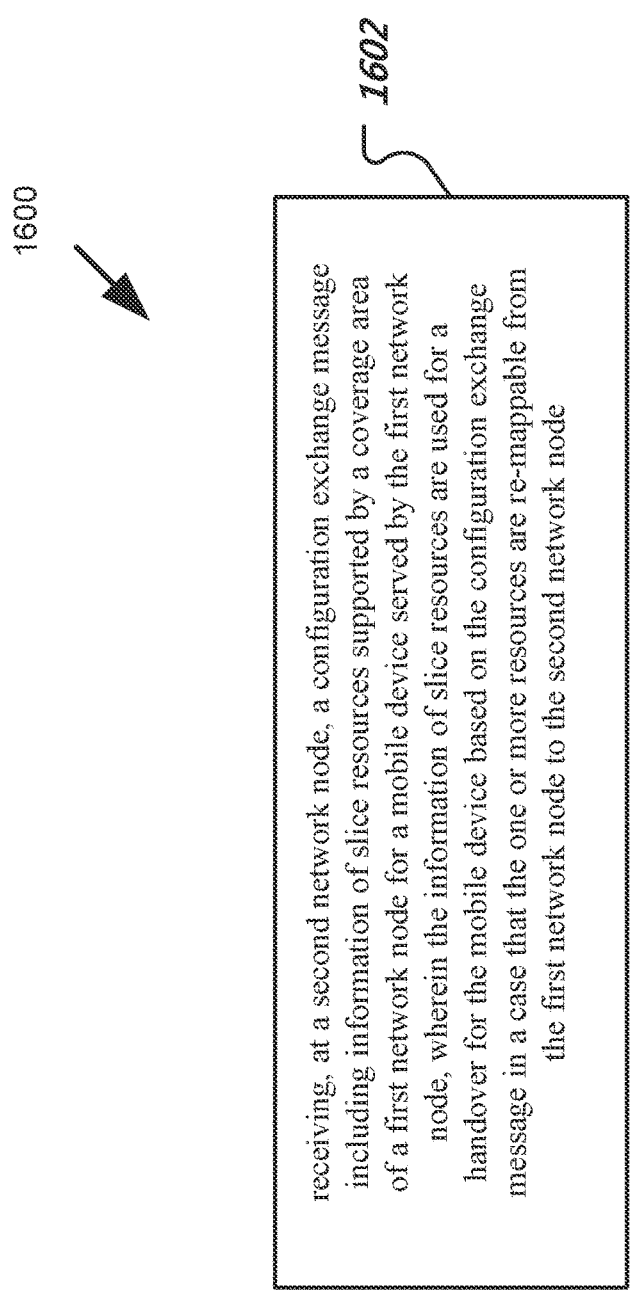
FIG. 16 illustrates a flowchart of an example method for supporting continuity of service.

FIG. 16 illustrates a flowchart of an example method for supporting continuity of service. For example, steps of this flowchart are discussed with respect to the target base station in embodiment 2 of this document. At step 1602, the process receives, at a second network node, a configuration exchange message including information of slice resources supported by a coverage area of a first network node for a mobile device served by the first network node, wherein the information of slice resources are used for a handover for the mobile device based on the configuration exchange message in a case that the one or more resources are re-mappable from the first network node to the second network node.

Figure 17:
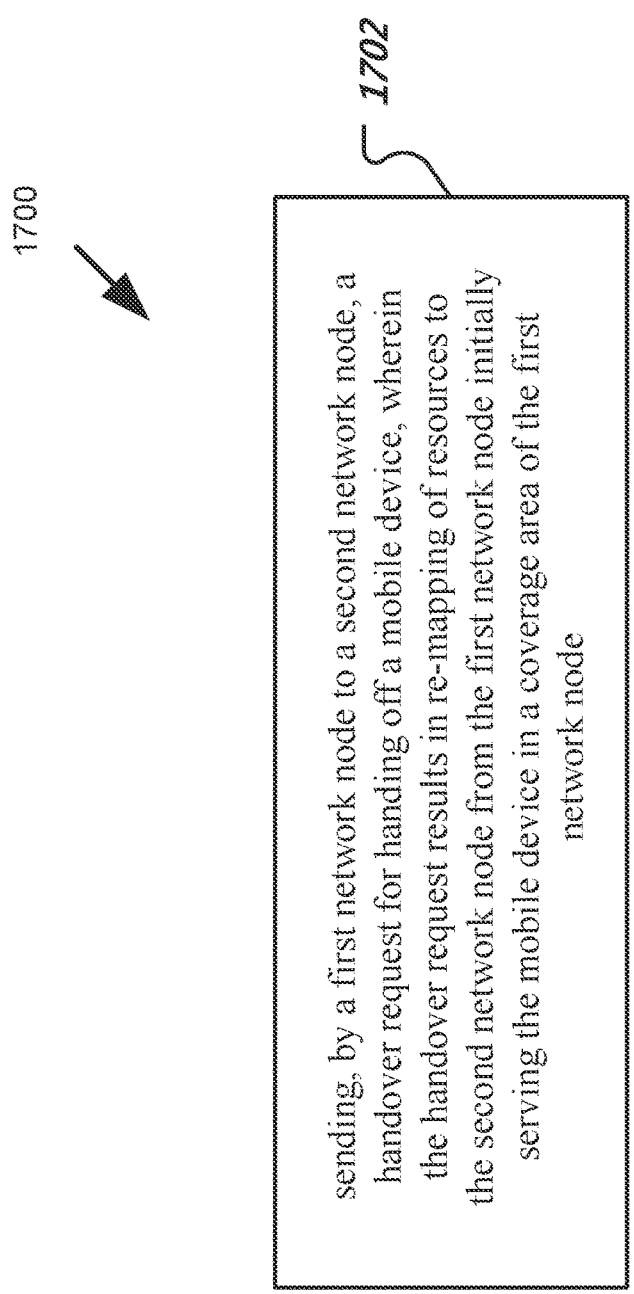
FIG. 17 illustrates a flowchart of an example method for supporting continuity of service.

FIG. 17 illustrates a flowchart of an example method for supporting continuity of service. For example, steps of this flowchart are discussed with respect to the source base station in embodiment 7 of this document. At step 1702, the process sends, by a first network node to a second network node, a handover request for handing off a mobile device, wherein the handover request results in re-mapping of resources to the second network node from the first network node initially serving the mobile device in a coverage area of the first network node.

Figure 18:
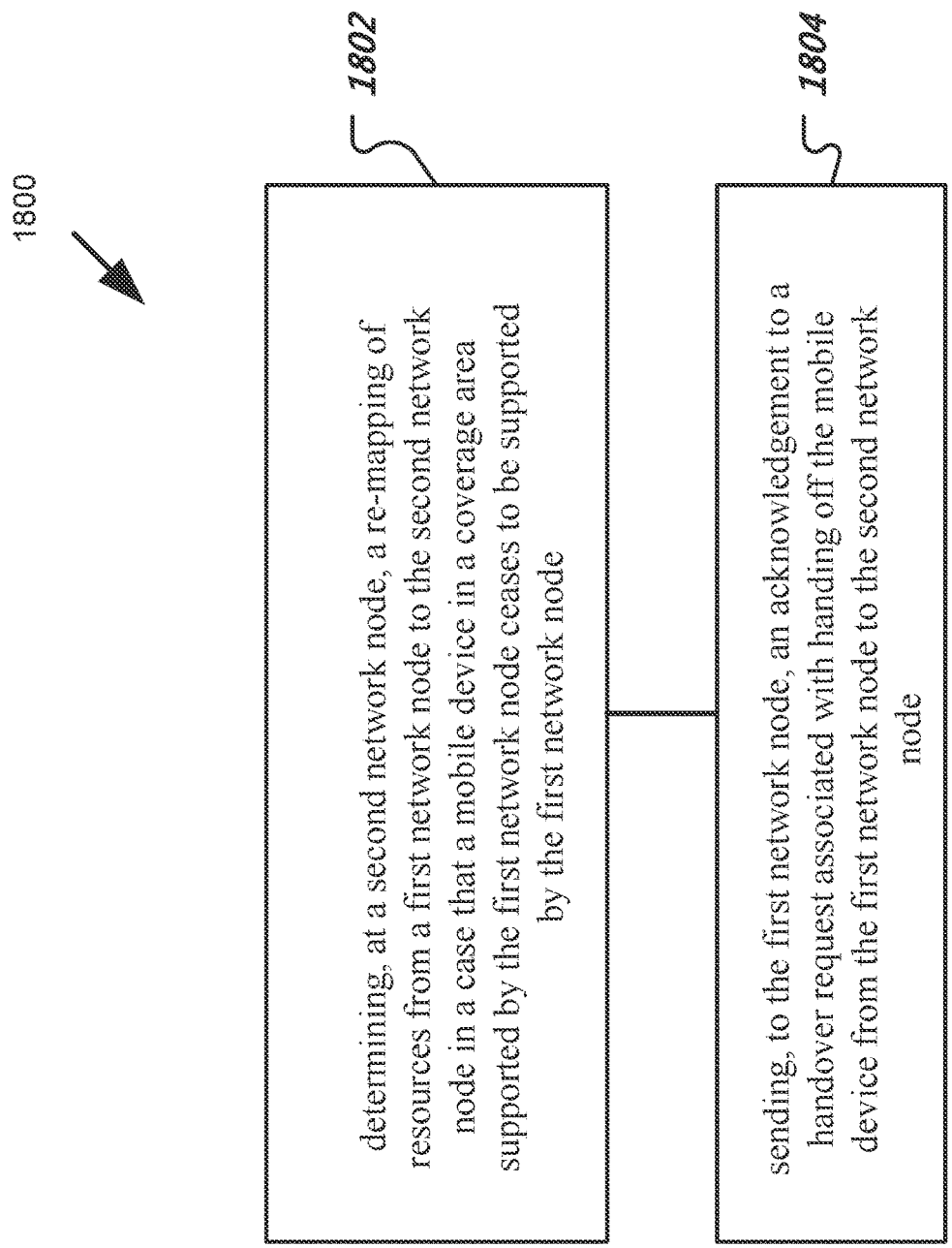
FIG. 18 illustrates a flowchart of an example method for supporting continuity of service.

FIG. 18 illustrates a flowchart of an example method for supporting continuity of service. For example, steps of this flowchart are discussed with respect to the target base station in embodiment 7 of this document. At step 1802, the process determines, at a second network node, a re-mapping of resources from a first network node to the second network node in a case that a mobile device in a coverage area supported by the first network node ceases to be supported by the first network node. At step 1804, the process sends, to the first network node, an acknowledgement to a handover request associated with handing off the mobile device from the first network node to the second network node.

Figure 19:
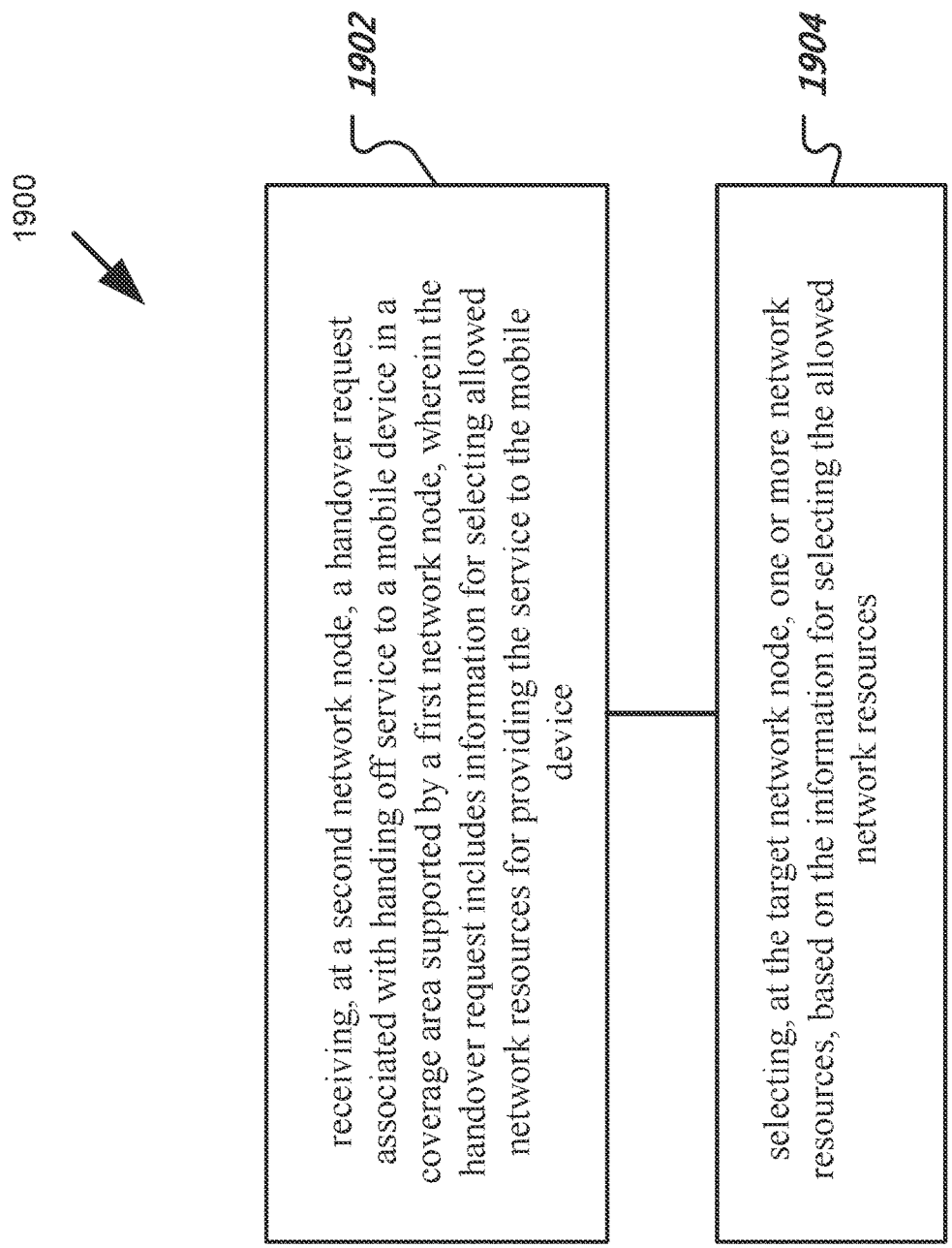
FIG. 19 illustrates a flowchart of an example method for supporting continuity of service.

FIG. 19 illustrates a flowchart of an example method for supporting continuity of service. For example, steps of this flowchart are discussed with respect to the target base station in embodiment 8 of this document. At step 1902, the process receives, at a second network node, a handover request associated with handing off service to a mobile device in a coverage area supported by a first network node, wherein the handover request includes information for selecting allowed network resources for providing the service to the mobile device. At step 1904, the process selects, at the target network node, one or more network resources, based on the information for selecting the allowed network resources.

Some embodiments of the disclosed technology are presented in clause-based format.

A1. A method for wireless communication (e.g., method described in FIG. 15), comprising: sending, by a first network node to a second network node, a first message including information for handling access and mobility management tasks associated with a mobile device, wherein the first network node is serving a mobile device in a coverage area of the first network node; and determining, at the first network node, based on a response message from a second network node, information of one or more resources available to the mobile device from the second network node in a case that the one or more resources are re-mappable from the first network node.

A2. The method of clause A1, wherein the information of the one or more resources available to the mobile device in a case that the one or more resources are re-mapped from the first network node includes at least one of: information related to Access and Mobility Management Function (AMF) functionality supported by the first network node and the second network node, information identifying a list of slices that are supported by a coverage area of the second network node, information indicating whether the second network node supports the RAN slice re-mapping functionality, or information indicating whether a core network element electronically coupled to the first network node supports RAN slice re-mapping functionality.

A3. The method of clause A1, wherein the first network node and the second network node are network access network (RAN) nodes.

A4. The method of clause A1, further comprising: determining, from the response message and the first message, whether the first network node and the second network node belong to the same Access and Mobility Management Function (AMF) or AMF set.

A5. The method of clause A1, wherein the first message is transmitted via an Xn interface associated with establishment of a connection between the first network node and the second network node.

A6. The method of clause A2, wherein the slice re-mapping functionality includes one or more of the following instructions: an instruction to a network node for supporting re-mapping of a network slice, a list of network slices supported by a network node that are available for re-mapping, an instruction to a network node to send allowed Network Slice Selection Assistance Information (NSSAI) of the mobile device, an instruction to a network node for supporting network slices through pre-configuration of re-mapping, or an indication that resources supported by a network node are insufficient.

A7. The method of clause A1, wherein the first network node is a RAN node and the second network node is a core network (CN) element.

A8. The method of clause A7, wherein the first message is transmitted via an NG interface associated with establishment of a connection between the RAN node and the core network element.

A9. The method of clause A8, wherein the response message includes information related to core network-side slice re-mapping functionality.

A10. The method of clause A9, wherein the information related to core network-side slice re-mapping functionality includes one or more of the following: an instruction associated with the core network to support slice re-mapping functionality and a list of slices supported by the core network that are available for re-mapping.

A11. The method of clause A1, wherein the case that the one or more resources are to be re-mapped from the first network node occurs upon the mobile device leaving the coverage area supported by the first network node and moving to a coverage area supported by the second network node.

A12. The method of clause 1, wherein the case that the one or more resources are to be re-mapped from the first network node occurs upon the first network node experiencing a shortage of resources to serve the mobile device.

A13. The method of clause A1, further comprising: receiving a notification message indicating modification of the one or more resources available to the mobile device from the second network node; and sending an acknowledgment to the second network node.

A14. The method of clause A13, wherein the notification message corresponds to a NG-RAN CONFIGURATION UPDATE message.

A15. The method of clause A15, wherein the acknowledgement corresponds to a NG-RAN CONFIGURATION UPDATE ACKNOWLEDGE message.

A16. The method of any one or more of clauses A1-A15, wherein the one or more resources available to the mobile device from the second network node correspond to network slice resources.

B1. A method for wireless communication (e.g., method described in FIG. 16), comprising: receiving, at a second network node, a configuration exchange message including information of slice resources supported by a coverage area of a first network node for a mobile device served by the first network node, wherein the information of slice resources are used for a handover for the mobile device based on the configuration exchange message in a case that the one or more resources are re-mappable from the first network node to the second network node.

B2. The method of clause B1, wherein the first network node is a source base station and the second network node is a target base station.

B3. The method of clause B1, wherein the information of the resources supported by the first network node includes slice information supported by a coverage area of the first network node.

B4. The method of clause B1, wherein the configuration exchange message is received from a core network element.

B5. The method of clause B1, wherein the configuration exchange message is a RAN CONFIGURATION TRANSFER message.

B6. The method of clause B1, wherein the information of the resources supported by the first network node includes an AMF set supported by the first network node.

B7. The method of clause B1, further comprising: determining, at the second network node, whether the handover of the mobile device belongs to an intra registration area type handover or an inter registration area type handover, based on the information of the slice resources supported by a coverage area of the first network node.

C1. A method for wireless communication (e.g., method described in FIG. 17), comprising: sending, by a first network node to a second network node, a handover request for handing off a mobile device, wherein the handover request results in re-mapping of resources to the second network node from the first network node initially serving the mobile device in a coverage area of the first network node.

C2. The method of clause C1, wherein the re-mapping of resources occurs at the second network node.

C3. The method of clause C1, wherein the first network node is a source base station and the second network node is a target base station.

C4. The method of clause C1, wherein the handover request is sent in response to the first network node determining that the first network node is to cease supporting the mobile device.

C5. The method of clause C1, further comprising: receiving, at the first network node, an acknowledgement from the second network node to the handover request.

D1. A method for wireless communication (e.g., method described in FIG. 18), comprising: determining, at a second network node, a re-mapping of resources from a first network node to the second network node in a case that a mobile device in a coverage area supported by the first network node ceases to be supported by the first network node; and sending, to the first network node, an acknowledgement to a handover request associated with handing off the mobile device from the first network node to the second network node.

D2. The method of clause D1, wherein the first network node is a source base station and the second network node is a target base station.

D3. The method of clause D1, wherein the re-mapping of resources is in response to the handover request.

E1. A method for wireless communication (e.g., method described in FIG. 19), comprising: receiving, at a second network node, a handover request associated with handing off service to a mobile device in a coverage area supported by a first network node, wherein the handover request includes information for selecting allowed network resources for providing the service to the mobile device; and selecting, at the target network node, one or more network resources, based on the information for selecting the allowed network resources.

E2. The method of clause E1, wherein the first network node and the second network node are a source base station and a target base station.

E3. The method of clause E1, wherein the handover request is received from a core network element.

E4. The method of clause E3, wherein the information for selecting the allowed network resources for providing the service to the mobile device is provided by the first network node to the core network element.

E5. The method of clause E3, wherein the information for selecting the allowed network resources includes Network Slice Selection Assistance Information (NSSAI) list of the mobile device.

E6. The method of clause E5, wherein the handover request further includes information of one or more resources available to the mobile device from the second network node in a case that the mobile device ceases to be served by the first network node.

E7. The method of any one or more of clauses A1-E6, wherein the re-mapping of resources corresponds to re-mapping network slice resources.

E8. The method of clause E7, wherein re-mapping network slice resources includes: upon determining that service to the mobile device supported by a network slice resource having a first ID is to be re-mapped, changing an association of the service to the mobile device from the network slice resource having a first ID to another network slice resource having a second ID.

E9. The method of clause E8, wherein service to the mobile device is identified in accordance with a protocol data unit (PDU) session ID.

E10. The method of any one or more of clauses A1-E6, wherein the resources are included in network slices.

E11. The method of clause E10, wherein a network slice is identified by a identifier (ID).

E12. An apparatus for wireless communication comprising a processor that is configured to carry out the method of any of clauses A1 to E11.

E13. A non-transitory computer readable medium having code stored thereon, the code when executed by a processor, causing the processor to implement a method recited in any of clauses A1 to E11.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   transmitting, from a second network node to a first network node, slice support information associated with the second network node;
   receiving, at a second network node, a handover request associated with handing off service to a mobile device in a coverage area supported by a first network node, wherein the handover request includes information that is determined, at the first network node prior to the handover request and based on the slice support information transmitted from the second network node, for selecting allowed network resources for providing the service to the mobile device; and
   selecting, at the second network node, one or more network resources, based on the information for selecting the allowed network resources.

2. The method of claim 1, wherein the handover request is received from a core network element.

3. The method of claim 2, wherein the information for selecting the allowed network resources for providing the service to the mobile device is provided by the first network node to the core network element.

4. The method of claim 1, wherein the information for selecting the allowed network resources includes Network Slice Selection Assistance Information (NSSAI) list of the mobile device.

5. The method of claim 1, wherein the handover request further includes information of one or more resources available to the mobile device from the second network node in a case that the mobile device ceases to be served by the first network node.

6. The method of claim 1, wherein the one or more network resources correspond to network slice resources, and wherein the selecting includes:
   upon determining that service to the mobile device supported by a network slice resource having a first ID is to be re-mapped, changing an association of the service to the mobile device from the network slice resource having a first ID to another network slice resource having a second ID.

7. The method of claim 6, wherein the service to the mobile device is identified in accordance with a protocol data unit (PDU) session ID.

8. An apparatus for wireless communication of a second network node, the apparatus comprising at least one processor and a memory storing instructions that, when executed by the at least one processor, cause the apparatus to:
   transmit, to a first network node, slice support information associated with the second network node;
   receive a handover request associated with handing off service to a mobile device in a coverage area supported by a first network node, wherein the handover request includes information that is determined, at the first network node prior to the handover request and based on the slice support information transmitted to the first network node, for selecting allowed network resources for providing the service to the mobile device; and
   select one or more network resources, based on the information for selecting the allowed network resources.

9. The method of claim 1, wherein the slice support information associated with the second network node identifies an Access and Mobility Management Function (AMF) set associated with the second network node.

10. The method of claim 1, wherein the slice support information is transmitted during an Xn interface setup process.

11. The method of claim 1, wherein the slice support information associated with the second network node is transmitted from the second network node to the first network node in response to the second network node receiving slice support information associated with the first network node.

12. The apparatus of claim 8, wherein the handover request is received from a core network element.

13. The apparatus of claim 12, wherein the information for selecting the allowed network resources for providing the service to the mobile device is provided by the first network node to the core network element.

14. The apparatus of claim 8, wherein the information for selecting the allowed network resources includes Network Slice Selection Assistance Information (NSSAI) list of the mobile device.

15. The apparatus of claim 8, wherein the handover request further includes information of one or more resources available to the mobile device from the second network node in a case that the mobile device ceases to be served by the first network node.

16. The apparatus of claim 8, wherein the one or more network resources correspond to network slice resources, and wherein the selecting includes:
   upon determining that service to the mobile device supported by a network slice resource having a first ID is to be re-mapped, change an association of the service to the mobile device from the network slice resource having a first ID to another network slice resource having a second ID.

17. The apparatus of claim 8, wherein the service to the mobile device is identified in accordance with a protocol data unit (PDU) session ID.

18. The apparatus of claim 8, wherein the slice support information associated with the second network node identifies an Access and Mobility Management Function (AMF) set associated with the second network node.

19. The apparatus of claim 8, wherein the slice support information is transmitted during an Xn interface setup process.

20. The apparatus of claim 8, wherein the slice support information associated with the second network node is transmitted from the second network node to the first network node in response to the second network node receiving slice support information associated with the first network node.

* * * * *